(12) United States Patent
Gausebeck et al.

(10) Patent No.: US 12,475,666 B2
(45) Date of Patent: Nov. 18, 2025

(54) SYSTEMS AND METHODS FOR DEFURNISHING AND FURNISHING SPACES, AND REMOVING OBJECTS FROM SPACES

(71) Applicant: CoStar Realty Information, Inc., Arlington, VA (US)

(72) Inventors: David Alan Gausebeck, Sunnyvale, CA (US); Japjit Tulsi, Sunnyvale, CA (US); Rj Pittman, Sunnyvale, CA (US); David Lippman, Sunnyvale, CA (US); Vivek Tanna, Sunnyvale, CA (US); Nicole Guernsey, Sunnyvale, CA (US); Olaf Brandt, Sunnyvale, CA (US)

(73) Assignee: CoStar Realty Information, Inc., Arlington, VA (US)

( * ) Notice: Subject to any disclaimer, the term of this patent is extended or adjusted under 35 U.S.C. 154(b) by 0 days.

(21) Appl. No.: 18/742,947

(22) Filed: Jun. 13, 2024

(65) Prior Publication Data

US 2024/0420437 A1    Dec. 19, 2024

Related U.S. Application Data

(60) Provisional application No. 63/567,185, filed on Mar. 19, 2024, provisional application No. 63/472,795, filed on Jun. 13, 2023.

(51) Int. Cl.
*G06T 19/20* (2011.01)
*G06T 17/20* (2006.01)
(Continued)

(52) U.S. Cl.
CPC .............. *G06T 19/20* (2013.01); *G06T 17/20* (2013.01); *G06V 10/82* (2022.01); *G06V 20/70* (2022.01);
(Continued)

(58) Field of Classification Search
CPC .................. G06V 10/82; G06V 20/70; G06T 2219/2024; G06T 2219/004;
(Continued)

(56) References Cited

U.S. PATENT DOCUMENTS

2020/0242201 A1\*  7/2020  Lafreniere ............ G06T 19/006
2021/0027539 A1    1/2021  Huang et al.
(Continued)

OTHER PUBLICATIONS

Lortz et al., "Enhancing Product Search with Large Language Models (LLMs)", Apr. 26, 2023, https://www.databricks.com/blog/enhancing-product-search-large-language-models-llms.html (Year: 2023).\*

(Continued)

*Primary Examiner* — Michelle L Sams
(74) *Attorney, Agent, or Firm* — Ahmann Kloke LLP

(57) ABSTRACT

An example system may access data of a multidimensional space representing a physical environment and identify interior elements within the multidimensional space using a first machine learning model. The interior element may represent furniture in the physical environment. The system may mask one or more of the interior elements with masks and fill each of the masks with imagery of the physical environment to create an appearance of a defurnished space, the defurnished space having the one or more interior elements appearing as missing from the multidimensional space representing the physical environment. The system may provide all or some of the defurnished space for display.

26 Claims, 13 Drawing Sheets

(51) Int. Cl.
   *G06V 10/82* (2022.01)
   *G06V 20/70* (2022.01)
(52) U.S. Cl.
   CPC ...... *G06T 2200/24* (2013.01); *G06T 2210/04* (2013.01); *G06T 2219/004* (2013.01); *G06T 2219/2024* (2013.01)
(58) Field of Classification Search
   CPC . G06T 2210/04; G06T 2200/24; G06T 17/20; G06T 19/20
   See application file for complete search history.

(56) References Cited

U.S. PATENT DOCUMENTS

| | | | | |
|---|---|---|---|---|
| 2021/0142497 | A1* | 5/2021 | Pugh | G06T 7/194 |
| 2022/0084296 | A1* | 3/2022 | Sadalgi | G06T 15/50 |
| 2022/0366153 | A1 | 11/2022 | Li et al. | |
| 2023/0177594 | A1* | 6/2023 | Besecker | G06T 19/20 |
| | | | | 705/27.2 |
| 2023/0177832 | A1* | 6/2023 | Besecker | G06F 3/011 |
| | | | | 345/633 |
| 2023/0333644 | A1* | 10/2023 | Cazamias | G06F 3/167 |
| 2024/0029279 | A1* | 1/2024 | Maschmeyer | G06T 5/77 |

OTHER PUBLICATIONS

Boussaha et al., "Large scale textured mesh reconstruction from mobile mapping images and LiDAR scans", ISPRS Annals of Photogrammetry, Remote Sensing and Spatial Information Sciences, vol. IV-2, 2018 (Year: 2018).*
CAD in black, "Revit—How to Hide and Isolate Elements", Sep. 27, 2021, https://www.youtube.com/watch?v=gs07XpRiK8Y (Year: 2021).*
Halmetoja, Esa. The role of digital twins and their application for the built environment. Industry 4.0 for the built environment: Methodologies, technologies and skills, pp. 415-442, 2022.
Yu, Jiahui et al., Free-form image inpainting with gated convolution, 2019.
Zeng, Yu, et al., High-resolution image inpainting with iterative confidence feedback and guided upsampling, 2020.
Zhang, Edward et al., No Shadow Left Behind: Removing Objects and their Shadows using Approximate Lighting and Geometry. In IEEE/CVF Conference on Computer Vision and Pattern Recognition (CVPR), 2021.
Zhang, Lvmin et al., Adding conditional control to text-to-image diffusion models, 2023.
Zhang, Richard, et al., The Unreasonable Effectiveness of Deep Features as a Perceptual Metric. In CVPR, 2018.
Zhang, Yinda, et al., PanoContext: A whole-room 3D context model for panoramic scene understanding. In European Conference on Computer Vision (ECCV) oral presentation, 2014.
Zhao, Hengshuang, et al., Pyramid scene parsing network, 2017.
Zhou, Bolei, Zhao, Hang, Xavier Puig, Sanja Fidler, Adela Barriuso, and Antonio Torralba. Scene Parsing through ADE20K Dataset. In IEEE Conference on Computer Vision and Pattern Recognition (CVPR), 2017.
Zhou, Yiyang, et al., Analyzing and Mitigating Object Hallucination in Large Vision-Language Models. In The Twelfth International Conference on Learning Representations, 2024.
International Application No. PCT/US2024/033913, International Search Report and the Written Opinion, dated Nov. 7, 2024, 8 pages.
Barnes, Connelly, et al., Patchmatch: a randomized correspondence algorithm for structural image editing. ACM SIG-GRAPH 2009 papers, 2009.
Bertalmio, Marcelo, et al., Image inpainting. In Proceedings of the 27th Annual Conference on Computer Graphics and Interactive Techniques, p. 417-424, USA, 2000. ACM Press/Addison-Wesley Publishing Co.
Chang, Angel, Dai, Angela, Funkhouser, Thomas, Halber, Maciej, Niessner, Matthias, Savva, Manolis, Song, Shuran, Zeng, Andy, and Zhang, Yinda. Matterport3d: Learning from rgb-d data in indoor environments. International Conference on 3D Vision (3DV), 2017.
Chen, Zhe, et al., Vision Transformer Adapter for Dense Predictions. In The Eleventh International Conference on Learning Representations (ICLR), 2023.
Chi, Lu, et al., Fast Fourier Convolution, In Advances in Neural Information Processing Systems (NeurIPS), 2020.
Daniotti, Bruno et al., The development of a bim-based interoperable toolkit for efficient renovation in buildings: From bim to digital twin. Buildings, 12(2):231, 2022.
Deitke, Matt, et al., Objaverse: A Universe of Annotated 3D Objects, 2022.
Delgado, Juan Manuel Davila and Oyedele, Lukumon. Digital twins for the built environment: learning from conceptual and process models in manufacturing. Advanced Engineering Informatics, 49:101332, 2021.
Dhariwal, Prafulla and Nichol, Alexander. Diffusion models beat GANs on image synthesis. In Advances in Neural Information Processing Systems, pp. 8780-8794. Curran Associates, Inc., 2021.
Dosovitskiy, Alexey, et al., An image is worth 16x16 words: Transformers for image recognition at scale. arXiv preprint arXiv:2010.11929, 2020.
Eyre, Jonathan, and Freeman, Chris. Immersive applications of industrial digital twins. The Industrial Track of EuroVR 2018, pp. 11-13, 2018.
Gao, Chao-Chen et al., Layout-guided Indoor Panorama Inpainting with Plane-aware Normalization. In Asian Conference on Computer Vision (ACCV), 2022.
Gkitsas, V et al., PanoDR: Spherical panorama diminished reality for indoor scenes, 2021.
Gkitsas, Vasileios, et al., Towards full-to-empty room generation with structure-aware feature encoding and soft semantic region-adaptive normalization, 2021.
Hays, James and Efros, Alexei A., Scene completion using millions of photographs. ACM Trans. Graph., 26(3):4-es, 2007.
Hu, Edward J., et al., LoRA: Low-Rank Adaptation of Large Language Models. In International Conference on Learning Representations, 2022.
Iizuka, Satoshi, et al., Globally and locally consistent image completion, ACM Transactions on Graphics, 36:1-14, 2017.
Isogawa, Mariko and Mikami, Dan and Iwai, Daisuke and Kimata, Hideaki and Sato, Kosuke. Mask Optimization for Image Inpainting. IEEE Access, 2018. 2.
Ji, Guanzhou et al., Virtual Home Staging: Inverse Rendering and Editing an Indoor Panorama under Natural Illumination. In International Symposium on Visual Computing, 2023.
Kalantari, Saleh and Neo, Jun Rong Jeffrey. Virtual environments for design research: Lessons learned from use of fully immersive virtual reality in interior design research. Journal of Interior Design, 45(3):27-42, 2020.
Kirillov, Alexander et al., Segment Anything. arXiv:2304.02643, 2023.
Kuehn, Wolfgang, Digital twins for decision making in complex production and logistic enterprises. International Journal of Design & Nature and Ecodynamics, 13(3):260-271, 2018.
Kulshreshtha, Prakhar et al., Layout Aware Inpainting for Automated Furniture Removal in Indoor Scenes. In IEEE International Symposium on Mixed and Augmented Reality Adjunct (ISMAR Adjunct), 2022.
Liu, Chen, et al., PlanerCNN: 3D plane detection and reconstruction from a single image, 2019.
Liu, Guilin, et al., Image inpainting for irregular holes using partial convolutions, 2018.
Liu, Hanchao et al., A Survey on Hallucination in Large Vision-Language Models, 2024.
Long, Jonathan, et al., Fully convolutional networks for semantic segmentation, 2015.
Lugmayr, Andreas, et al., RePaint: Inpainting using Denoising Diffusion Probabilistic Models, 2022.

(56) References Cited

OTHER PUBLICATIONS

Mantiuk, Rafal K., et al., FovVideoVDP: a visible difference predictor for wide field-of-view video. ACM Transactions on Graphics (SIGGRAPH), 40(4), 2021.

Nazeri, Kamyar, et al., Edgeconnect: Structure guided image inpainting using edge prediction. In Proceedings of the IEEE/CVF International Conference on Computer Vision (ICCV) Workshops, 2019.

Osher, Stanley, et al., An iterative regularization method for total variation-based image restoration. Multiscale Modeling & Simulation, 4(2):460-489, 2005.

Pathak, Deepak, et al., Context encoders: Feature learning by inpainting, 2016.

Ramakrishnan, Santhosh Kumar, et al., Habitat-Matterport 3D Dataset (HM3D): 1000 Large-scale 3D Environments for Embodied AI. In Thirty-fifth Conference on Neural Information Processing Systems Datasets and Benchmarks Track, 2021.

Rombach, Robin et al., High-resolution image synthesis with latent diffusion models, 2022.

Ronneberger, Olaf et al., U-net: Convolutional networks for biomedical image segmentation, 2015.

Ruiz, Nataniel, et al., DreamBooth: Fine Tuning Text-to-image Diffusion Models for Subject-Driven Generation. In IEEE/CVF Conference on Computer Vision and Pattern Recognition (CVPR), 2023.

Schuhmann, Christoph, et al., LAION-5B: An open large-scale dataset for training next generation image-text models. In 36th Conference on Neural Information Processing Systems (NeurIPS), 2022.

Shahzad, Muhammad, et al., Digital twins in built environments: an investigation of the characteristics, applications, and challenges. Buildings, 12(2):120, 2022.

Song, Yuhang, et al., Spg-net: Segmentation prediction and guidance network for image inpainting, 2018.

Sun, Cheng, et al., HorizonNet: Learning Room Layout With 1D Representation and Pano Stretch Data Augmentation. In The IEEE Conference on Computer Vision and Pattern Recognition (CVPR), 2019.

Suvorov, Roman, et al., Resolution-robust Large Mask Inpainting with Fourier Convolutions. Winter Conference on Applications of Computer Vision (WACV), 2022.

Telea, Alexandru. An image inpainting technique based on the fast marching method. Journal of Graphics Tools, 9, 2004.

Tonmoy, S. M. Towhidul Islam et al., A Comprehensive Survey of Hallucination Mitigation Techniques in Large Language Models, 2024.

Wang, Xintao, et al., Real-ESRGAN: Training Real-World Blind Super-Resolution with Pure Synthetic Data. In International Conference on Computer Vision Workshops (ICCVW), 2021.

Wang, Y. T., et al., A survey of personalized interior design. In Computer Graphics Forum. Wiley Online Library, 2023.

Wang, Zhou, et al., Image Quality Assessment: From Error Visibility to Structural Similarity. IEEE Transactions on Image Processing, 13 (4), 2004.

Xu, Ziwei, et al., Hallucination is Inevitable: An Innate Limitation of Large Language Models, 2024.

Yu, Jiahu et al., Generative image inpainting with contextual attention, 2018.

* cited by examiner

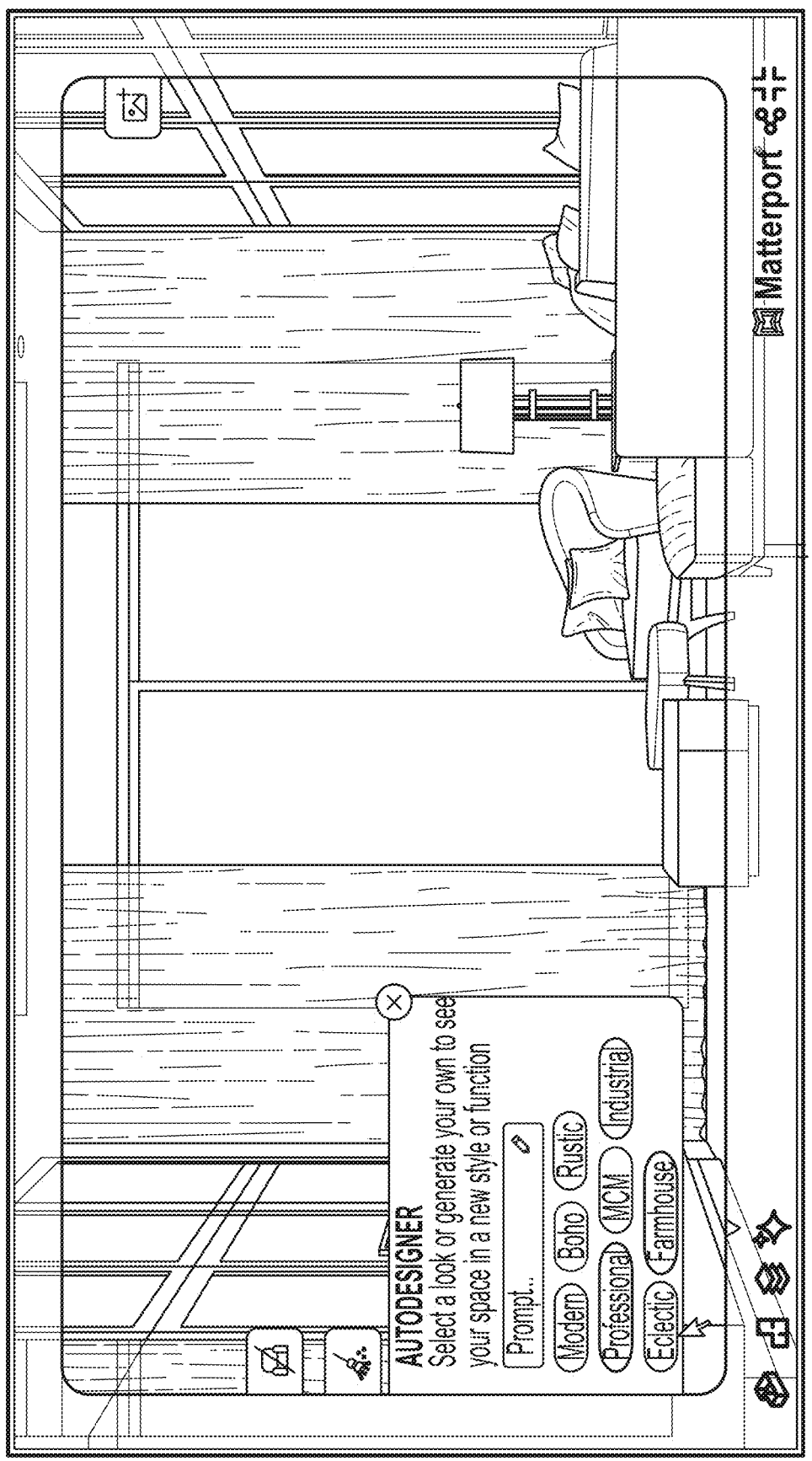

SYSTEMS AND METHODS FOR DEFURNISHING AND FURNISHING SPACES, AND REMOVING OBJECTS FROM SPACES

RELATED APPLICATIONS

This application claims the priority benefit of U.S. Provisional Patent Application No. 63/567,185, filed on Mar. 19, 2024, entitled "SYSTEMS AND METHODS FOR DEFURNISHING AND FURNISHING SPACES, AND REMOVING OBJECTS FROM SPACES" and U.S. Provisional Patent Application No. 63/472,795, filed on Jun. 13, 2023, entitled "PROPERTY VISUALIZATION BASED ON GENERATIVE AI AND COMPUTER VISION," which are incorporated by reference herein.

TECHNICAL FIELD

This application generally relates to techniques for modification of digital models and, more particularly, to removal of interior elements of digital models that are generated based on real-world environments.

BACKGROUND

Walkthroughs of virtual environment are becoming increasingly more common over the Internet. For example many users have options to utilize real estate networks to navigate through virtual walk throughs of different homes. Being able to navigate through a home before physically visiting the property has revolutionized home purchases and allowed more people than ever to visit properties at their leisure, even if they are geographically unable to conveniently travel to those locations.

Unfortunately, users cannot interact with those virtual environments. As a result, users are forced to guess and rely on their imaginations of what rooms, homes, or other environments may be like without furniture or decoration. Similarly, if a user wishes to consider alternative users or, furniture, décor, or styles, they are forced to guess at dimensions, possible furniture placement, preferred styles, and the like.

SUMMARY

In various embodiments, the techniques described herein relate to a non-transitory computer-readable medium including executable instructions, the executable instructions being executable by one or more processors to perform a method, the method including: accessing data of a multidimensional space representing a physical environment, identifying interior elements within the multidimensional space using a first machine learning model, the interior element representing furniture in the physical environment, masking one or more of the interior elements with masks, filling each of the masks with imagery of the physical environment to create an appearance of a defurnished space, the defurnished space having the one or more interior elements appearing as missing from the multidimensional space representing the physical environment, and providing all or some of the defurnished space for display.

In some aspects, the physical environment is a furnished room. The multidimensional space may be a 2D representation of the physical environment. In some embodiments, the 2D representation of the physical environment is used to generate a corresponding 3D representation of the physical environment. In various embodiments, the multidimensional space is a 3D representation of the physical environment The data of the multidimensional space may be a textured 3D mesh. The interior elements within the multidimensional space may further include at least one wall within the physical environment. The first machine learning model may be a semantic segmentation neural network. Filling each of the masks with the imagery of the physical environment may include applying inpainting to the masks.

The method may further include: receiving a selection of at least one design style type from a user, and selecting interior elements within the multidimensional space that were previously identified based on the at least one design style type from the user, wherein masking at least some of the interior elements including masking the at least some of the interior elements that are of the at least one design style type.

In some embodiments, the method further includes: receiving a selection of at least one design style type from a user, and selecting interior elements within the multidimensional space that were previously identified based on the at least one design style type from the user, wherein masking at least some of the interior elements including masking the at least some of the interior elements that are not of the at least one design style type.

In some aspects, the techniques described herein relate to receiving an additions request from a user, the additions request including one or more additional interior elements to be added to the defurnished space, identifying representations of the one or more additional interior elements, positioning the one or more additional interior elements within the defurnished space, and providing at all or some of the defurnished space with the one or more additional interior elements positioned within the defurnished space for display.

In some embodiments, receiving an additions request from the user includes receiving a prompt from a user and applying the prompt to a large language model to receive a response from the large language model, the response identifying the one or more additional interior elements.

An example system includes at least one processor and memory containing executable instructions. The executable instructions may be executable by the at least one processor to: access data of a multidimensional space representing a physical environment, identify interior elements within the multidimensional space using a first machine learning model, the interior elements representing furniture in the physical environment, mask at least some of the interior elements with masks, fill each of the masks with imagery of the physical environment to create an appearance of a defurnished space, the defurnished space having the at least some of the interior elements appearing as missing from the multidimensional space representing the physical environment, and provide all or some of the defurnished space for display.

In some aspects, the physical environment is a furnished room. The multidimensional space may be a 2D representation of the physical environment. In some embodiments, the 2D representation of the physical environment is used to generate a corresponding 3D representation of the physical environment. In various embodiments, the multidimensional space is a 3D representation of the physical environment The data of the multidimensional space may be a textured 3D mesh. The interior elements within the multidimensional space may further include at least one wall within the physical environment. The first machine learning model may be a semantic segmentation neural network. Filling each of the masks with the imagery of the physical environment may include applying inpainting to the masks.

The executable instructions may be further executable by the at least one processor to: receive a selection of at least one design style type from a user, and select interior elements within the multidimensional space that were previously identified based on the at least one design style type from the user, wherein masking at least some of the interior elements including the at least some of the interior elements that are of the at least one design style type.

In some embodiments, the executable instructions may be further executable by the at least one processor to: receive a selection of at least one design style type from a user, and select interior elements within the multidimensional space that were previously identified based on the at least one design style type from the user, wherein masking at least some of the interior elements including masking the at least some of the interior elements that are not of the at least one design style type.

In various embodiments, the executable instructions may be further executable by the at least one processor to: receive an additions request from a user, the additions request including one or more additional interior elements to be added to the defurnished space, identify representations of the one or more additional interior elements, position the one or more additional interior elements within the defurnished space, and provide at all or some of the defurnished space with the one or more additional interior elements positioned within the defurnished space for display.

In some embodiments, the executable instructions being executable by the at least one processor to receive an additions request from the user includes the executable instructions being further configured by the at least one processor to receive a prompt from a user and apply the prompt to a large language model to receive a response from the large language model, the response identifying the one or more additional interior elements.

BRIEF DESCRIPTION OF THE DRAWINGS

FIGS. 5A-5D depict an example user interface that may be utilized to furnish a space in some embodiments.

Throughout the drawings, like reference numerals will be understood to refer to like parts, components, and structures.

DETAILED DESCRIPTION

This description is of a system that receives or generates data about a space (a room, house, other building, outdoor area, etc.), generates representations of alternate version(s) of the space with different furnishings, materials, etc. and then displays those alternate version(s) to a user. One embodiment would be a system that starts from a Matterport digital twin of a space, removes all of the furniture and other furnishings, adds new furnishings matching a style prompt such as "mid-century modern," and displays the new version of the space so that a user can see what it would look like with different furnishings.

Many places in this description mention "internal elements," "furnishings," or "furnishings and/or materials." These terms are not intended to be restrictive and could include any internal element such as furniture, wall hangings, exercise equipment, appliances, window treatments, paint, wallpaper, flooring materials, kitchen and bathroom fixtures and cabinets, lighting, plants, landscaping elements, walls, fireplaces, ceiling fans, structural elements such as railings or staircases, and other items and elements that could be modified about a physical space.

Figure 1:
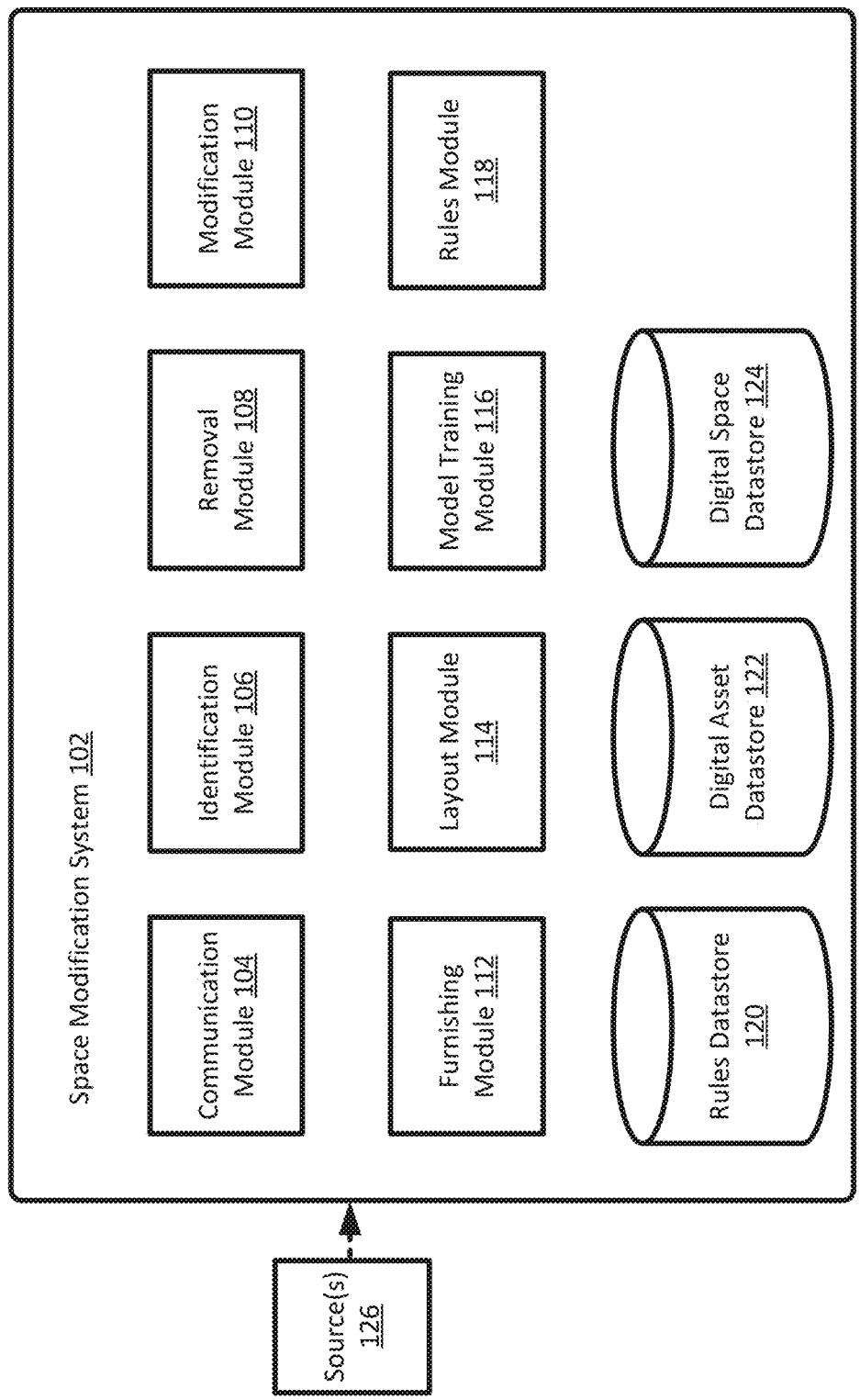
FIG. 1 is an example space modification system in some embodiments.

FIG. 1 is an example space modification system 102 in some embodiments. The space modification system 102 may be executable on a digital device. A digital device is any system with memory and a processor. Digital devices are further discussed herein (e.g., with regard to FIG. 6). The space modification system 102 may include a communication module 104, an identification module 106, a removal module 108, a modification module 110, a furnishing module 112, a layout module 114, a model training module 116, a rules module 118, a rules datastore 120, a digital asset datastore 122, and a digital space datastore 124. It will be appreciated that the space modification system 102 may include more or fewer modules as shown in FIG. 1. Further, it will be appreciated that the modules may be on any number of digital devices in communication with each other (e.g., the space modification system 102 may include any number of digital devices). A module may be hardware, software, or a combination of both hardware and software.

The communication module 104 receives and provides information to and from the space modification system 102 and among any number of modules within the space modification system 102. In some embodiments, the communication module 104 may receive digital models (e.g., digital twins and digital spaces that represent real-world environments) from a source 126. The source 126 may be one or more digital devices and/or data storages that can provide any number of digital models or parts of digital models. In one example, source 126 is a third party or user. The user may provide commands to one or more source(s) 126 (e.g., web servers, web platforms, data lakes, digital devices, and/or the like) to provide one or more digital models to the communication module 104. Alternately, a user may provide commands to the space modification system 102 to retrieve digital models or pieces of digital models from any number of sources 126 (e.g., over one or more networks, such as the Internet, by the communication module 104 which may utilize source APIs).

In some embodiments, the communication module 104 may receive 2D data, 3D data, and/or digital models as discussed herein.

The identification module 106 may identify one or more internal elements within a digital model, 2D data, and/or 3D data. In various embodiments, the identification module 106 may apply a rules-based approach, an AI model approach (e.g., CNN), or a combination of both to identify internal elements (e.g., furniture, fixtures, load-bearing structures, non-load-bearing structures, walls, lights, and the like). Rules and internal elements are further described herein.

The removal module 108 may remove one or more internal elements identified by the identification module 106 from the digital model. In some embodiments, the removal module 108 removes internal elements identified in the 2D data, the 3D data, and/or the digital model. In various embodiments, the removal module 108 may mask and fill in the internal elements to make them appear removed in the 2D data, the 3D data, and/or the digital model.

The modification module 110 may optionally modify a digital model. In various embodiments, the modification module 110 may apply different colors, textures, styles, or the like to surfaces or internal elements in the 2D data, the 3D data, and/or the digital model.

The furnishing module 112 may optionally add additional internal elements to the digital model. In various embodiments, the user may manually select using a user interface (UI) any number of internal elements to add to a part of the digital model (e.g., a room). In various embodiments, a catalog is provided to assist the user in finding internal elements. The catalog may allow searching of internal elements by type, design style, brand, cost, or the like. In various embodiments, the furnishing module 112 may utilize AI models (e.g., CNNs) and/or rules-based approaches to select and add additional internal elements to the digital model or recommend additional internal elements to the user. Based on input from the user, the furnishing module 112 may adjust and improve recommendations based on the feedback using the AI models and/or rules-based approaches.

In some embodiments, the furnishing module 112 utilizes internal element rules and layout rules to assist in identifying the correct internal element for particular rooms (e.g., a sofa in a living room but not a bathroom). Layout rules may be applied to position and orient the internal elements. Example layout rules may include not blocking doorways, positioning sofas inline with walls, clearances between walls and different types of internal elements (e.g., ensuring there is room to sit in a chair or access a toilet), and/or the like. In various embodiments, the layout rules may assist the furnishing module 112 in selecting the appropriate type of internal element to add to a room (e.g., a sofa of a particular length or removing end tables because of lack of space).

The layout module 114 may position and orient internal elements within the 2D data, 3D data, and/or digital model. In some embodiments, the layout module 114 applies the layout rules to position and orient internal elements (e.g., light fixtures, furniture, objects, walls, bars, and/or the like). In some embodiments, the furnishing module 112 performs layout operations and the model training module 116 is not necessary.

The model training module 116 may train one or more machine learning (e.g., artificial intelligence) models. Machine learning models may be trained to identify and classify internal elements (e.g., adding metadata to internal elements to assist in identification, selection, and/or placement). Models may be used to select internal elements for removal while other machine learning models may be trained to provide a user with options to virtually stage a space with desired internal elements (e.g., furniture that meets certain requirements such as desired style, shape, color, and/or the like).

The rules module 118 may retrieve, modify, add, remove, and/or store rules (e.g., in the rules datastore 120). The rules module 118 may apply, for example, rules approaches that assist in the selection of internal elements, provides a guide to the user to select internal elements (e.g., based on design style, type of internal element, spacing allocations), removing of internal elements, and the like. These rules may replace or augment AI models as discussed herein. Additionally or alternatively, the rules module 118 may retrieve, modify, add, remove, and/or store internal element rules and/or layout rules in the rules datastore 120 as discussed herein.

The rules datastore 120 is any data structure (e.g., database, table, file system, and/or the like) that may store and provide access to the rules that allow for selection of internal elements, providing a guide to the user to select internal elements (e.g., based on design style, type of internal element, spacing allocations), removing of internal elements, and the like. These rules may replace or augment AI models as discussed herein. Additionally or alternatively, the rules datastore 120 may store or provide access to the internal element rules and/or layout rules as discussed herein. The rules datastore 120 may be local or remote to the space modification system 102. In various embodiments, the rules datastore 120 may include portions that are local and portions that are removed to the space modification system 102 (e.g., the rules datastore 120 may comprise multiple databases containing similar or different information across different digital devices and networks).

The digital asset datastore 124 is any data structure (e.g., database, table, file system, and/or the like) that may store and provide access to digital assets (e.g., assets that represent internal elements to be added, identified, removed, assessed for guidance, used for training of AI models, and/or the like. The digital asset datastore 124 may be local or remote to the space modification system 102. In various embodiments, the digital asset datastore 124 may include portions that are local and portions that are removed to the space modification system 102 (e.g., the digital asset datastore 124 may comprise multiple databases containing similar or different information across different digital devices and networks).

In some embodiments, the space modification system 102 may include or be in communication with a model generation system. In this example, the model generation system may generate digital models based on the 2D data and/or 3D data. An example of a model generation system can be found in U.S. Pat. No. 11,094,137, titled "Employing three-dimensional (3D) data predicted from two-dimensional (2D) images using neural networks for 3D modeling applications and other applications," which is incorporated by reference herein. It will be appreciated that the identification module 106 may identify internal elements from the 2D data and/or the 3D data before, after, or during creation of the 3D model using the 2D data and/or 3D data.

In various embodiments, the space modification system 102 (e.g., utilizing modules of U.S. Pat. No. 11,094,137 discussed herein) utilizes 2D image(s) of a space to generate a corresponding 3D representation (e.g., via photogrammetry, monocular depth estimation, neural radiance fields (NeRF), and/or other 2D-to-3D techniques). The input 2D images in this case could be received or captured with or without auxiliary position and orientation data. 2D images with position and orientation data may be considered 3D data.

In various embodiments, the space modification system 102 (e.g., utilizing modules of U.S. Pat. No. 11,094,137 discussed herein) generates 3D data about a space from a 2D floor plan or other layout information and then to infer a height of the space. Other possible representations of 3D data about a space include textured or untextured meshes, point clouds, depth maps, and/or implicit or latent representations in a NeRF or other neural network.

Figure 2:
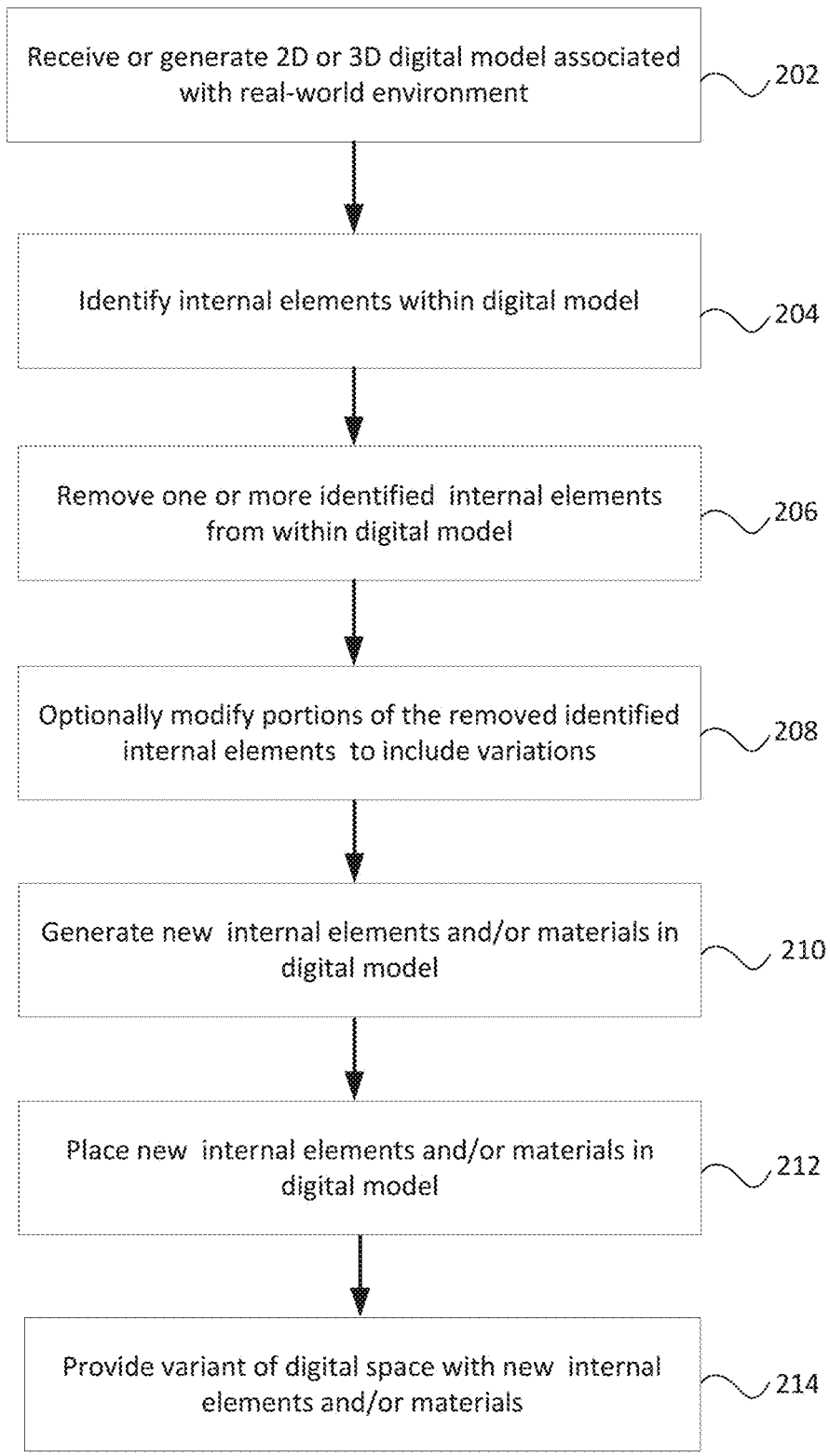
FIG. 2 is a method for defurnishing and refurnishing one or more portions (e.g., rooms) of a digital model of a real-world space (referred to herein as "space") in some embodiments.

FIG. 2 is a method for defurnishing and refurnishing one or more portions (e.g., rooms) of a digital model of a real-world space (referred to herein as "space") in some embodiments. In step 202, the communication module 104 receives 2D or 3D data (e.g., a digital model or digital twin) associated with a real-world space. The 2D or 3D data may be received from one or more sources. A source may include a data storage, system, or the like. In one example, an external source may include a third-party that generates and/or stores digital models of spaces. In one example, the communication module 104 may utilize an API to retrieve a digital model from a third-party via a network (e.g., from the Internet). In another example, the communication module 104 may receive the digital model from a third-party via a network (e.g., via a push of the digital model from the third-party source). In some embodiments, the 2D or 3D data is retrieved from a local or remote datastructure (e.g., database). In various embodiments, a digital model is generated and then the communication module 104 receives the digital model.

In some embodiments, the communication module 104 may receive a digital twin of a space. The digital twin may include a textured 3D mesh. A digital twin is a virtual model or representation of an environment (e.g., of a room, building, and/or environment). The digital twin of a space may allow for interaction within the space. A 3D mesh may be a collection of vertices, edges, and faces that define a shape of objects, structures, surfaces, and/or the like within the digital twin. The mesh may provide a geometric framework that outlines the dimensions and structures of physical propert(ies). A textured 3D mesh may be generated by texture mapping (e.g., using 2D images and/or point cloud data of the real world environment).

Other data about the space may also be received or generated. For example, 2D images may be received or captured directly, or they may be generated from a 3D representation. Data about the structure, connectivity, and/or use of different parts of the space may also be received (e.g., via metadata) or generated, such as labeling a certain part of the space as "kitchen" or information about the locations of doors and windows within the space. In some embodiments, the space modification system 102 utilizes the automated classification system discussed with regard to U.S. Pat. No. 11,670,076, titled "Automated Classification Based on Phot-Realistic Image/Model Mappings," which is incorporated by reference herein. In one example, the space modification system 102 utilizes automated classification of rooms and spaces within the 2D data, 3D data, and/or related digital model (e.g., utilizing semantic segmentation) to identify and classify rooms, space, parts of the space, and/or the like to generate labels and/or other classifications that may be used for selection of interior elements and/or placement of interior elements (e.g., utilizing interior element rules and/or layout rules discussed herein).

In step 204, the identification module 106 identifies one or more internal elements within the digital model. In some embodiments, the identification module 106 identifies internal elements (e.g., furnishings, objects, fixtures, load and non-load bearing components, properties, and/or the like) in the 2D images of the space (panoramas or flat images) using a publicly available, pretrained semantic segmentation neural network such as ViT-Adapter-L+Mask2Former+BEiTv2 pretrain, CLIPSeg, and/or many other semantic segmentation or other networks which can identify and segment objects or regions in 2D images. This identifies part(s) of the image as belonging to a class like "wall," "chair," etc. In various embodiments, the identification module 106 generates labels that may be associated with the related structure (e.g., via metatags, tags, metadata, and/or the like) indicating the class, type of internal element, placement of internal element, and/or the like.

In some embodiments, the identification module 106 may utilize multiple neural networks to classify internal elements from the digital model, 2D data, and/or 3D data and either aggregate the results (e.g., adding or overwriting labels and tags) and/or score the results for later comparison. In some embodiments, different neural networks may be weighted such that different aspects of classification may be scored more heavily when compared to other neural network classification for those particular aspects.

The identification module 106 may identify internal elements in 3D space using a publicly available, pretrained semantic segmentation neural network. Similar to that discussed above, this may identify parts of the image as belonging to a class like "wall," "chair," etc. As similarly discussed herein, the identification module 106 may generate labels that may be associated with the related internal elements (e.g., via metatags, tags, metadata, and/or the like) indicating the class, type of internal element, placement of internal element, and/or the like.

It will be appreciated that the identification module 106 may identify one or more internal elements of the digital model, 2D data, and/or 3D data at any time. For example, a digital model may be received and the identification module 106 may identify one or more internal elements of the digital model, 2D data, and/or 3D data. Further internal elements may be identified of the digital model 2D data, and/or 3D data from one or more other models or at different times. Labels and tags may be created and added to a database or the digital model over time.

In step 206, the removal module 108 removes one or more internal elements (e.g., existing internal elements of the digital model identified in step 204) from the digital model. It will be appreciated that the removal module 108 may remove any internal elements and/or structures from the digital model. For example, the removal module 108 may remove one or more objects, materials, textures, walls, floors, or the like to create a "defurnished" version of the digital model (e.g., a "defurnished" version of the space). What should be removed depends on the specific application and/or user input, and it might be that nothing needs to be removed at this step.

The removal module 108 may mask out portions of each image identified as internal element(s) to be removed. In some embodiments, the removal module 108 may mask out portions of each image identified as internal element(s) to be removed and fill one or more of those portions with imagery of what the room or scene would look like without those internal element(s).

In some embodiments, the removal module 108 may fill one or more of the portions of each image using a publicly available, pretrained inpainting neural network such as stable-diffusion-2-inpainting with a text prompt like "empty room." Digital inpainting is the taks of generating pixels to cover regions of an image. In one example, to generate a defurnished 3D representation of the space, the masks from each 2D image above are projected onto the 3D mesh of the space using the known position and orientation of the camera that captured each 2D image, and the mesh faces corresponding to masked image regions are removed from the 3D mesh. This may leave holes in the 3D mesh that can be filled using techniques like plane extension, to fill in the walls and floor behind objects that were removed. Together, these create a 3D representation plus 2D images of the defurnished version of the space.

In addition to or in alternative to removing furnishings, materials that may be replaced rather than removed. In one example, the removal module 108 may identify properties or internal elements to modify such as floor tile, wall sections, countertops, etc. In optional step 208, the modification module 110 may utilize one or more of the same semantic segmentation network as above to assist in identifying and/or replacing internal element(s) or properties of internal element(s) in the digital space. For example, the modification module 110 may optionally use a publicly available, pretrained instance segmentation neural network such as Segment Anything to separate different sections of material that might have the same class such as two walls that are adjacent to each other. The modification module 208 may replace or modify the portions to be removed above to add the appearance of floor tile, wall sections, countertops, and/or the like.

In some embodiments, the identification module 106 may identify internal elements and portions of the space first in 3D and then map those 3D identifications into 2D, rather than 2D-mapped-to-3D as described above. For example, the identification module 106 could receive or generate a 2D or 3D floor plan or other simplified representation of the geometry of the space, and then the identification module 106 could use the differences between the full 3D representation of the space and the simplified geometry to identify furnishings. In one example, a chair is present in the full 3D representation but not in the floor plan, so it can be identified as an internal element. Surfaces in a simplified representation could also be identified as walls and floors that have materials that could be replaced by the modification module 110.

The identification module 106 may utilize additional or alternative methods to identify internal elements and materials from the 3D representation of the space. In one example, the identification module 106 may perform a rule-based analysis of the geometry or neural networks that take 3D point cloud or graph type inputs and either identify internal elements and materials directly or produce outputs describing the space in a way that can be used as input to other identification systems, such as feature vectors that could be used as input to another neural network trained to identify those feature vectors as furnishings.

It will be appreciated that identifying internal elements, materials, and other portions of the space need not happen exclusively first in 3D or 2D; techniques can be applied to both domains (2D and 3D) and then aggregated and projected to the other domain as needed. For example, the identification module 106 may identify furnishings in 2D images, then those 2D detections could be projected to 3D using information about the 2D image poses and the geometry of the space, then the detections could be refined based on how they overlap in 3D, and then the refined 3D detections could optionally be projected back into 2D images.

In addition to starting from the full representation of the space and removing objects until reaching the "defurnished" version, it is also possible to generate a defurnished version of the space directly. A furnishing module 112 may fit planes to the 3D representation until the major structure of a space (floor, walls, etc.) has been reproduced, and details are not added matching the details of the furnishings. In various embodiments, the furnishing module 112 may utilize a neural network to directly generate data about a defurnished version of a space given data about the original space as input. For example, an image-to-image generative model could be trained to take images of a furnished space as input and produce images of the defurnished version of the space as output. Similarly, a top-down view of the space could be provided to a network to produce a floor plan (defurnished) view of the space as output. This could also be done in 3D, with a network taking images and/or 3D data about a space as input and producing a 3D representation of the defurnished or simplified space as output. Examples of this include training or generating a NeRF or Gaussian Splat representation of a space, possibly combined with other techniques such as using diffusion-based priors to fill in the regions where furnishings have been removed.

This identification and defurnishing step also does not have to be done for an entire space at once. For example, internal elements may be identified, modified, and/or removed (and new structures added) from individual rooms or subregions of a space, or it can even be done one internal element or room at a time. This could be done in an automated, incremental manner (defurnish one object, room, etc. and then use that partially-defurnished result as input to defurnish the next object, room, etc.) and/or it could be user-guided.

For example, the communication module 104 may provide a user interface (UI) and/or receive inputs from a UI generated by another device or system. In this example, the user may view the digital model on their device in the UI and engage by interacting (e.g., clicking) on objects to remove them or click on rooms to defurnish those specific rooms, or the process could be guided by text prompts from a user such as "remove the chairs in the dining room." The text prompts could be generated by a large language model (LLM) or modified by an LLM. Other forms of user guidance could include accepting or rejecting proposals made by the system, providing feedback on such proposals, providing text or drawing prompts to guide the system towards a better solution, or even manual editing such as editing 2D images or 3D data. Also, when describing these and other forms of user guidance, the user providing the guidance may not be the intended end user who will see the final results; for example a service company could have workers who provide this guidance to produce a better result without manual effort from the intended end user.

The pretrained networks discussed herein and other approaches above are just examples, and there are many other networks which can perform similar functions. In addition, the system may be more effective by training or fine-tuning networks specifically for this task. For example, the model training module 116 may provide additional training of a stable-diffusion-2-inpainting network using a dataset of images of unfurnished spaces to make it better at producing that sort of imagery, instead of relying on its ability to generate any sort of imagery and relying on the text prompt to make sure that imagery looks like an unfurnished version of the space. Such additional training could use training samples that match or approximate the inputs expected when the system is in use, such as using input images with artifacts that are not present in the target images. For example, the training input images could contain imperfectly masked objects (or other internal elements) not present in the target images, or shadows or reflections of such objects. This can make the trained network more robust to such artifacts, such as the network learning that when an object is partially masked, the entire object plus its shadow should be removed from the output image.

This or other techniques could be combined with algorithms or networks that determine how to combine the generated imagery with the input imagery to increase the visual quality of the output, for example by using the input imagery in relatively unchanged regions and blending with the generated imagery. Other techniques to improve results of the neural networks can include the communication module 104 providing auxiliary data from a different domain, such as using ControlNet to provide depth images, normal-vector images, and/or semantic segmentation images of a simplified or unfurnished version of the 3D mesh projected to match the 2D image when generating the 2D inpainting imagery of what a space would look like without furnishings. Auxiliary data could also include the results of previous inpainting or defurnishing results, such as by first removing furnishings in one or more viewpoints and then propagating the defurnished images or 3D data as inputs to later inpainting steps, so that those later steps can generate results consistent with the earlier steps or benefit from the context that was available to those earlier steps. In addition to the modification module 110 inpainting images individually or sequentially, images could be generated or inpainted simultaneously using techniques such as correspondence-aware attention to improve consistency between the generated images.

While many of the approaches described for this step involve neural networks, rule-based approaches, algorithmic approaches, or a combination of neural networks, rule-based approaches, and/or algorithmic approaches may be utilized. For example, a simplified version of a 3D mesh could be generated using geometric analysis to remove everything that is not part of the structure of the space, and then that simplified mesh can be used to generate 2D images where the furnishings have been removed, filling in regions of each 2D image that project onto parts of the mesh that were removed during simplification. To generate the inpainted imagery, algorithmic techniques can be used to propagate textures along the planes that were extended to fill those same regions in 3D.

In some embodiments, new interior elements may be added to a space or part of a space (e.g., one or more rooms within a space). The new interior elements may be added to an existing space (e.g., that has not been "defurnished") or they may be added to "defurnished" spaces using systems and methods described herein. The addition of interior elements may be manual (e.g., interior elements may be added manually to a space through the UI), automatic (e.g., the furnishing module 112 may automatically add and place interior elements), or a combination of both. Further, it will be appreciated that a user or automated system may be guided by user indications of preferences and/or by previous selections/placements.

In step 210, the furnishing module 112 may generate new internal elements and/or materials in the space in a way that is plausible given the geometry and/or other characteristics of the space. For example, new furniture should be placed at the appropriate height to be resting on the floor, not interpenetrating walls or other furniture, not blocking doorways, etc. One or more internal element rules and/or layout rules defining the function for appropriate heights, limiting interpenetrating walls or furniture, not blocking doorways, and/or the like may be created (e.g., by the user or an operator of the system). An internal element rule may include one or more rules that indicate the type of internal element(s) that may be removed or added to a digital space. The internal element rules may include, for example, types of internal elements for types of rooms (e.g., a sofa for a living room but not a bathroom), likelihood of finding a particular type of internal element in a particular room (e.g., 60% of finding a sofa in a living room and a 25% chance of finding a sofa in a game room if the game room is under 10 feet per wall, and the like). The may also be layout rules that limit placement and orientation of internal elements or encourage placement/orientation based on certain parameters. For example, a layout rule may required that doorways not be blocked by newly added internal elements and/or that certain internal elements are added based on input from the user such as designations of an "open" layout style.

Internal element rules and/or layout rules may be generated by a user (e.g., customized by that particular user's needs), based on common internal element rules and/or layout rules for similar spaces (e.g., a residence house may have internal element and layout rules that are similar to other residences and warehouses may have internal element and layout rules that are similar to other warehouses), or spaces selected by the user to emulate (further discussed herein). The internal element rules and the layout rules may be stored in any location (e.g., locally and/or remotely. In one example, all or some of the internal element rules and/or layout rules may be stored in the rules datastore 120.

The furnishing module 112 may generate new internal elements and/or place them in the digital model (e.g., the defurnished digital model) based, in part, on those rules. For example, the furnishing module 112 or the layout module 114 may place a new floor material so that it covers the entire floor of a room but does not extend up onto the walls or other objects (e.g., by retrieving an applying the appropriate internal element and/or layout rule(s)).

It will be appreciated that the internal element and/or layout rules may be generated, stored, and applied in many different ways by the rules module 118. In some embodiments, a user may generate global rules to be applied in any number of models for that particular user (e.g., based on the user ID), that user's group or team, or any number of other associated users. In some embodiments, a user may generate and apply internal element and/or layout to only one digital model at a time, a subset of digital models, or all digital models associated with that user. In various embodiments, the UI may provide a list of digital models available to the user and the user may select one or more (e.g., all) digital models to have the internal element and/or layout applied. Similarly, the UI may provide options for the user to register or associate themselves with one or more other users or groups of users. The UI may allow a user to apply internal element and/or layout to one or more (e.g., all) users when they utilize the system to furnish a space. It will be appreciated that the UI and the system may allow a user to customize rules, create new rules, delete rules, and apply them in a manner they wish (e.g., to any number of digital models and/or other users depending on rights to the digital models and/or rights to enforce/offer rules to other users).

In various embodiments, of adding interior elements (e.g., furnishing or refurbishing) a digital model, the furnishing module 112 may add furnishings to the space in the form of textured 3D objects from a library or catalog. Adding 3D objects to the same coordinate system as the defurnished 3D mesh of the space may be straightforward, and then the combined 3D data (space mesh+object mesh(es)) may be provided and/or displayed together (e.g., in the UI) from any viewpoint to show what the space would look like furnished with the new objects.

In some embodiments, the furnishing module 112 determines which internal elements (e.g., objects and/or walls) to add and the positions and orientations that should be used to place those internal elements. In some embodiments, the furnishing module 112 utilizes a rule-based system along with a random seed to select and place the objects.

The furnishing module 112 may separate the space into sub-regions (rooms) based on mostly-enclosed regions of the 3D mesh and assign one or more labels such as "kitchen" or "bedroom" to each room using an image classification neural network that takes image(s) of a room and predicts the room type class(es) that match each image. As discussed herein, in some embodiments, the space modification system 102 utilizes the automated classification system discussed with regard to U.S. Pat. No. 11,670,076, titled "Automated Classification Based on Phot-Realistic Image/Model Mappings," which is incorporated by reference herein. In one example, the space modification system 102 utilizes automated classification of rooms and spaces within the 2D data, 3D data, and/or related digital model (e.g., utilizing semantic segmentation) to identify and classify rooms, space, parts of the space, and/or the like to generate labels and/or other classifications that may be used for selection of interior elements and/or placement of interior elements (e.g., utilizing interior element rules and/or layout rules discussed herein).

In some embodiments, new interior elements may be added to a space or part of a space (e.g., one or more rooms within a space). The new interior elements may be added to an existing space (e.g., that has not been "defurnished") or they may be added to "defurnished" spaces using systems and methods described herein. The addition of interior elements may be manual (e.g., interior elements may be added manually to a space through the UI), automatic (e.g., the furnishing module 112 may automatically add and place interior elements), or a combination of both. Further, it will be appreciated that a user or automated system may be guided by user indications of preferences and/or by previous selections/placements.

In various embodiments, the UI may provide options and/or guidance to a user. The UI may enable the user to defurnish (e.g., using system and methods described herein) the space and/or enable the user to add interior elements to the digital model (e.g., one or more rooms). In one example, the UI may depict a particular room (e.g., a living room) and provide a catalog of interior elements to add to the room. The interior elements may be organized by category and include, for example, specific types of furnishings, portable objects, fixtures, walls, fireplaces, lights (with or without light emitting from one or more lights), and/or the like. The user may select an interior element and then either drag the interior element into the desired part of the digital model being displayed by the UI or may select that the interior element be automatically placed within the digital model (e.g., in a particular room and/or desired location).

The UI may, in some embodiments, provide a guided experience. In one example, UI may provide a list of any number of interior elements (e.g., stored in datastore 124). One or more of the interior elements may be associated with metadata (e.g., tags or labels) that identify the type of interior element (e.g., sofa, chair, table, wall, hanging light fixture, toy, and/or the like). In some embodiments, one or more of the interior elements may be include metadata to indicate one or more rooms that the interior element is likely to be found in and/or the design style of the interior element. A design style may indicate the type of style associated with the interior element. Examples of design styles include, but are not limited to, contemporary, modern, southwest, vintage, traditional, European, Scandinavian, naval, industrial, rustic, Bohemian, art deco, and/or the like.

In some embodiments, a user may indicate the type of design style they wish for a particular room (e.g., through a menu of options or typing the desired style into a field in the UI). The UI or furnishing module 112 may provide a list of interior elements of that style (e.g., by matching labels and/or metadata that fit the desired interior elements. In some embodiments, the user may identify the type of interior element (e.g., lounge chair) and type of style (e.g., traditional) to add to a room (e.g., living room) in the digital model. The UI may provide a list of lounge chairs of the desired type of style for the user's selection for placement in the room based on metadata associated with the interior elements (e.g., metadata for an interior element may include a "type," any number of associated "interior style(s)," and/or suitable room(s) (or non-suitable rooms—for example, it would be unlikely that someone would want a lounge chair in a bathroom).

It will be appreciated that any number of interior elements may be associated with the metadata (e.g., labels) in any number of ways. For example, interior elements may be associated with one or more labels based on manual labeling by the user (e.g., customization) and/or trained personnel (e.g., utilizing manual labeling or rules discussed herein). In another example, interior elements may be associated with one or more labels by trained models (e.g., CNNs and/or LLMs).

In some embodiments, the furnishing module 112 may determine one or more internal elements to add to a space or part of a space by generating a score for different internal elements based on user input (e.g., preferences of internal elements), metadata as described herein, and/or type of room. Further, internal element rules described herein may assist in calculating a score or provide a weight to the score. In one example, the furnishing module 112 may identify a type of room from room classification (discussed herein) and retrieve one or more internal element rules and layout rules associated with that type of room to assist in identifying appropriate internal elements and placement for that type of room. For example, to place the first furnishing in a room of type "living room," the furnishing module 112 might have a 60% chance to select a sofa as the first object. The furnishing module 112 may then choose a wall of the room against which to place that sofa, measure the available space on that wall that does not block doorways or other openings (e.g., based on layout rules discussed herein), and look in the catalog for objects of type "sofa" with the appropriate dimensions. Subsequently, the furnishing module 112 may choose a position and orientation for the sofa against the chosen wall. Next, based on the room type and the presence of a sofa, the furnishing module 112 may have a 25% chance that the next object should be an entertainment center, with rules that it should try to place it against a wall and facing the sofa. Internal elements can continue to be chosen and placed in the room until a (also possibly randomized) metric, indication from the user, or input associated with density/sparseness indicates that the room is sufficiently furnished and no further objects are added. This process can be repeated for each room until the entire space has been furnished. User's may also provide additional input during or after the process to govern or change internal element selection and/or placement.

It will be appreciated that each room can be furnished independently (e.g., using a greedy algorithm) to select and place internal elements based on the room type, room geometry, and/or existing internal elements.

It will be appreciated that the furnishing module 112 may also provide guidance or automate layout of selected interior elements (e.g., either manually selected, automatically selected, or a combination of manual and automatically selected interior elements).

In some embodiments, the user or the layout module 114 may select a particular design style to assist in layout (e.g., placement and positioning) of interior elements. In one example, a style selection may be a basic form of guidance, but many more forms of guidance or user input may be used when generating the layouts.

It will be appreciated that a user may provide options, requirements, or limitations to assist in interior element selection and layout. For example, there may be any number of layout styles associated with different interior element layouts. A layout may include particular rules to apply to layout of interior elements (e.g., walls and/or furnishings) in part or subspace in a digital model. For example, the layout module 114 may receive an indication of a particular room and a particular layout style from the user (e.g., open, enclosed, efficient, or the like). The layout module 114 may retrieve a layout policy or layout rules associated with the particular layout style and utilize the layout rules associated with the layout style to place interior elements within the selected room.

In some embodiments, interior elements may include metadata to indicate accessibility (e.g., for people with certain limitations or preferences), color (e.g., for color scheme), price (e.g., for budget of item or for aggregate with other interior elements), association with specific events, brands, sources (e.g., local or department store), environmentally friendly, locally sourced materials, preferred materials, or excluded materials. A user may provide the UI with one or more of these options (and other options as will be apparent) to assist in layout and/or selection of interior design elements for one or more rooms. A user, for example, may select specific rooms or regions to furnish, change the type or purpose of rooms (e.g., furnish this bedroom as a home office instead), choose a layout style (e.g. open vs. efficient), add requirements to the layout such as accessibility, choose a color scheme for the furnishings, provide a target budget for the total cost of the furnishings, including or excluding specific elements (e.g. make sure the den includes an exercise bike), design for a specific purpose or event (e.g., an open-plan office or a wedding), preferred or excluding certain brands or sources for the furnishings, or preferred or excluding certain materials such as leather. User guidance for all of these purposes can be provided as discrete choices and values (e.g., selected from a menu of the UI), or they could be provided as free-form text, voice, and/or image prompts to be interpreted by a neural network.

Another option for guidance input could be to provide another space (e.g., a link to a Matterport space) as a style reference to emulate. In this example, the layout module 114 may retrieve metadata associated with the selected space, identify interior elements, determine metadata associated with the interior elements (e.g., color, accessibility, price, associated events, brands, sources, environmentally friendly, locally sourced materials, preferred materials, and/or excluded materials. The layout module 114 may also retrieve layout style associated with the selected space. Subsequently, the layout module 114 may identify one or more interior elements based on the retrieved metadata to identify one or more interior elements to include in the user's space. The layout module 114 may, for example, identify interior elements based on a type of room that the user wishes to furnish (e.g., by applying the applicable rules associated with that type of room) and select interior elements based on the metadata associated with the selected room to emulate. The layout module 114 may also retrieve a layout associated with the selected room to emulate and apply the layout style (e.g., based on layout rules) to the user's room for placement and orientation of interior elements. In some embodiments, the layout module 114 may also determine the degree of interior element density or scarcity (e.g., number of interior elements) of the selected room to emulate when identifying and positioning interior elements in the user's room to be furnished.

It will be appreciated that the rules may be generated, stored, and applied in many different ways. In some embodiments, a user may generate global rules to be applied in any number of models for that particular user (e.g., based on the user ID), that user's group or team, or any number of other associated users. In some embodiments, a user may generate and apply rules to only one digital model at a time, a subset of digital models, or all digital models associated with that user. In various embodiments, the UI may provide a list of digital models available to the user and the user may select one or more (e.g., all) digital models to have the rules applied. Similarly, the UI may provide options for the user to register or associate themselves with one or more other users or groups of users. The UI may allow a user to apply rules to one or more (e.g., all) users when they utilize the system to furnish a space. It will be appreciated that the UI and the system may allow a user to customize rules, create new rules, delete rules, and apply them in a manner they wish (e.g., to any number of digital models and/or other users depending on rights to the digital models and/or rights to enforce/offer rules to other users).

An alternative to a rule-based system for selecting and placing objects is a trained neural network that generates one or more layouts. In some embodiments, a network is trained to represent space layouts and design element information (e.g., layout and design element data) as multi-channel images, such as a simplified floor plan image with different colors or other channel values that indicate object types and placement metadata. These image encodings of space layouts can pass through a variational autoencoder (VAE) and then the latent representation of each space can be used with a latent diffusion model to generate variations on how to furnish a space. The output images can then be interpreted according to the image encoding system to extract information about object types, dimensions, and placements that are used to select and place objects from the 3D object catalog.

In various embodiments, space layouts, room types, and objects placed within each space may be represented as a series of tokens and then a large language model (LLM) type network is trained (e.g., by the model training module 116) to emit a token sequence describing a furnishing layout when given a token sequence describing the unfurnished space as input. The data for training such networks (of either type described, or other types) could come from analyzing the layouts of real spaces or from the layouts of synthetic 3D spaces. Such data about synthetic layouts could also come from the system itself after further interaction from users or other manual or automated systems of evaluation. For example, if furnishing module 112 generates layouts and some of those layouts receive indications of user approval or disapproval or are edited by users, the model training module 116 could train to produce layouts similar to those that receive user approval or to layouts after they have been edited by users.

For both the rule-based and neural network approaches, there can be additional inputs to guide the furnishing choices. One such input could be a furnishing style choice such as "contemporary" or "traditional." This can be used at the point of selecting specific 3D objects from the catalog, where each object can have information about how well it matches each possible style choice, and then the final object selections are weighted to prefer objects that match the input style.

These style associations could be manually entered for each catalog object, or they could be generated by a neural network trained to classify images of objects according to their style.

The style input can also be used earlier in the process and influence the general types and placements of objects. In a rule-based system, each style could have different weightings for the types of furnishings associated with that style, the total amount of furnishings to use, etc. In a system using a trained neural network, the layouts used as training examples for the network can be labeled by style and then the network can directly learn how to vary its output to better match each style.

In addition to guidance when generating the initial furnishings, the UI may provide guidance to assist the user to modify the generated furnishings. Some possible forms for this modification include repositioning individual furnishings, replacing individual furnishings (either with a newly generated replacement or by allowing the user to choose a specific replacement, possibly from a list of suggestions), choosing variants of an individual furnishing or material such as a different color, or adding specific new furnishings. When modifying furnishings, the user input could again be in the form of free-form text prompts or questions to be interpreted by a neural network. In one example, the text prompts could be generated by a large language model (LLM) or modified by an LLM. These replacements or modifications can also be done at the scale of multiple furnishings or all the furnishings in one or more rooms, or the entire space. For example, the user could simply ask for a new variation of furnishing the entire space and keep telling the system to try again (with a different random seed each time) until the result is one they find pleasing. The user could also ask for more specific modifications such as for the furnishings in a room to be rearranged to include more seating, or to keep a similar layout but choose furnishings with a different budget. Also, as mentioned above under the defurnishing step, user guidance could be used to decide which furnishings to remove from the original space, and that could be used with this same modification guidance to modify or replace original furnishings rather than the generated furnishings.

In addition to placing furnishings, the system could also replace materials in the space such as changing a floor from carpet to hardwood, or changing the paint color on the walls. The material options can again come from a catalog, but in this case the catalog would be of 2D materials that are applied to surfaces in the space based on the 3D data about the shape and position of those surfaces. Even for 3D objects from a catalog, "furnishings" is a convenient descriptor for many things that could be added to a space, but other types of objects can also be added, such as fireplaces, ceiling beams, window treatments, etc.—anything that could be made available in a 3D or 2D catalog of objects or materials. Objects from the catalog could also be modified by changing their dimensions, colors, etc.

Placement of 3D objects from a catalog is also not the only possible approach for adding furnishings. Another option is to generate 2D imagery or 3D data for the new furnishings or materials directly from a neural network. For example, instead of generating criteria for an object that can be matched against a catalog or directly selecting a catalog entry, the system could generate a text or latent description of an object, layout, or style it wants to add to a room and then use an image-generation network to inpaint that content in the appropriate place in the room using the content description as guidance to the network. This can also be done at a larger scale, directly generating imagery or 3D data of entire furnished room(s) instead of generating layout metadata (object types and positions) as an intermediate step. One issue with this approach is that without proper guidance such generated imagery is unlikely to be consistent between different viewpoints, but multiple approaches to address this have been established, including some discussed under the defurnishing approaches such as simultaneous image generation or propagating results from one or more generation steps as inputs to later generation steps In the case of generating 3D data for the new furnishings directly such as a 3D mesh, mesh textures, point cloud, NeRF or Gaussian Splat representation, etc., consistency between viewpoints is an inherent benefit of the 3D data.

Another option for generating furnishings is to use some or all of the furnishings that were detected and removed from the original space. 3D models or other representations of these furnishings could be extracted using the data from the original space associated with each furnishing, and these models of the original furnishings could be added to the space in the same way as furnishings chosen from a catalog. This would support rearranging the furnishings in a space, instead of or in addition to adding new furnishings. Instead of creating 3D models or other representations of these objects, the system could also find matching or similar objects in its catalogs of 3D objects, or it could use other approaches such as the latent diffusion inpainting described above, using the detected furnishings as guidance. Any original furnishings detected and extracted in this way could also be used during any modifications to the generated furnishings, whether or not they are part of the initial set of generated furnishings, such as adding back some of the original furnishings that were removed.

All of these methods of generating furnishings and/or materials can be used separately or in combination to generate one or more variants of a space. Each variant of a space could be generated independently, or some variants could be based on previously generated variants, or variants could be generated simultaneously to have certain properties such as showing an intentionally diverse set of layouts.

Figure 5B:
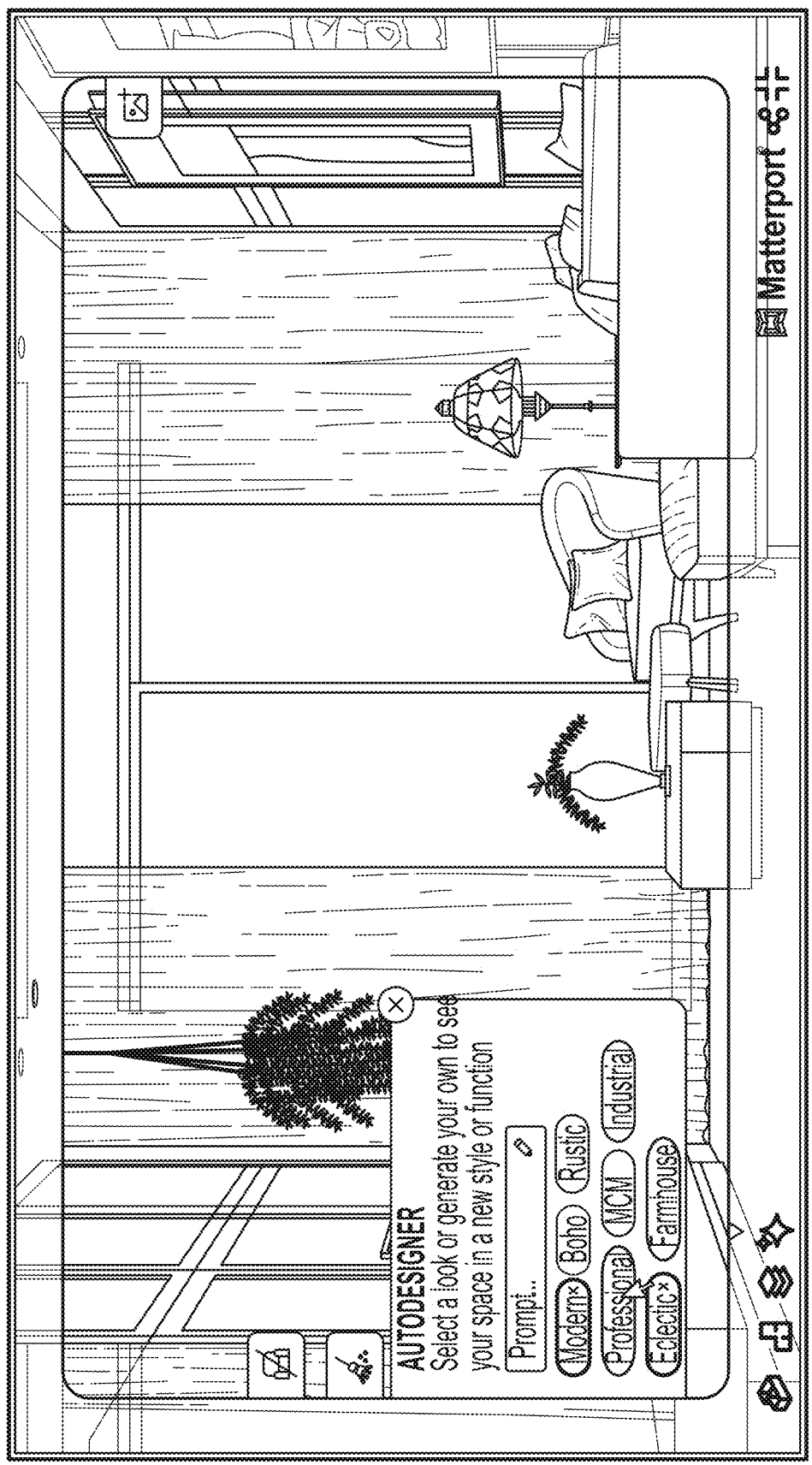

In step 212, the communication module 104 provides a display or presents the variant or variants of the space after the modifications in the previous steps in some embodiments. One form of display would be to generate one or more 2D images of a variant of the space. 2D images may be generated from 3D data. In one example, FIG. 5A depicts a user interface depicting a digital model of a room and FIG. 5B depicts the user interface depicting a modified variant of the digital model of the room with some internal elements replaced and changed.

In the embodiment of refurnishing a Matterport space, a variant of the space can be displayed on the user's device (e.g., via a Matterport web viewer or UI) with the same view modes and navigation controls as the original digital model (e.g., the original digital space before any changes), including the ability to view the textured 3D mesh of the space from a variety of angles and viewpoints ("dollhouse mode"), the ability to view the space from above in a floor plan style view, and the ability to navigate inside the space and see how the space looks from many different viewpoints in different rooms and at different angles. In some embodiments, the space as viewed in all of these modes and from all of these viewpoints may not be entirely consistent (even the unmodified space may have some degree of multi-view inconsistency due to conflicting data or imperfect processing), but in general the variant of the space may be presented with multi-view consistency such that a viewer can navigate or look around the space and better understand how the new furnishings and/or materials look and fit in the space and relative to each other using multiple viewpoints, including novel viewpoints different from those where data was captured in the space. In various embodiments, the space as viewed in one, more, or all of these modes and from one, more, or all viewpoints may be consistent.

In addition to an interactive web experience, other ways a modified space could be presented in the UI which may include other interactive experiences such as dedicated apps, VR, or AR, as one or more 2D images and/or videos (panoramic or flat images or video, including stereo pairs), and/or as one or more of various 3D representations such as point clouds, 3D meshes, light fields, or implicit or latent representations such as NeRF. The space could also be presented as a text or voice description, including descriptions of the furnishings, materials, etc. that were added, where they were added, or characteristics of the layout such as "this office layout accommodates 50 people." The added furnishings and materials could also be presented as a list or other type of summary, including quantities, prices, and/or other data or measurements such as amount of paint or flooring required to cover the surfaces. These various forms of presentation may also be combined, such as by labeling or highlighting the added furnishings in a 2D image or interactive 3D web viewer.

In addition to passive presentation such as in a 2D image or video or a presentation that is interactive for purposes of navigation and choosing viewpoints in a UI such as a 3D web viewer, the presentation can include other types of interactive elements or enhancements. In particular, the presentation interface may also support all of the interactions required for user guidance described above such as menus, buttons, or text entry that let the user modify the generated furnishings. This can include the interface for initiating the operation of the system such as selecting a space to be processed by the system and submitting a request for the system to generate a variant of the space with new furnishings, or to request a new variant of a space. The interface could also support searching among or filtering the generated furnishings, saving the variant of the space or other information about the generated furnishings, undoing and redoing modifications to the generated furnishings, switching between presenting different variants of the space or different modifications to the generated furnishings, showing only portions of a variant of the space, and/or showing multiple variants at once such as in a side-by-side or split view, with a comparison slider to change how much of each variant is in view, or by showing multiple variants overlaid or blended together.

Other context and information about the space (original and/or the variant being presented) may also be included in the presentation such as measurements, dimensions, or other attributes or information about the space. In addition, the presentation may adapt based on the user's interaction with it, such as by presenting additional information or making suggestions based on the user's current viewpoint. For example, if the user is viewing the kitchen in a home, the system could suggest that the user try the guidance prompt "How many chairs can I fit at the kitchen table?"

One aspect of presenting the variant of the space is the appearance of the added furnishings and/or materials. Goals of the presentation could be to make the added furnishings look photorealistic, to make their appearance look pleasing, to make their appearance match the appearance of the rest of the space, and/or to present the furnishings in an intentionally unrealistic style for purposes such as aiding the understanding of the space or highlighting the added furnishings. With the approach of adding furnishings as 3D objects from a library, a simple rendering of those objects positioned inside the space might not achieve those appearance goals. One way to improve the appearance in view of the preferred appearance styles (e.g., photorealistic, vintage, unrealistic styles) could be to use more accurate or realistic lighting and shadows during the rendering process, and information about the 3D space can be used to do that. In particular, the layout module 114 and/or the furnishing module 112 may utilize geometry of the space to calculate where to place shadows based on synthetic or detected light sources or using approaches such as ambient occlusion. In addition, the 3D objects can be lit based on the lighting present in the space, including light sources that are detected in the data about the original space (that were not removed during defurnishing) and any light sources added by the system (e.g. from a lamp added as a furnishing). For detecting light sources in the original space, the identification module 106 may treat each image captured in the space with a known position and orientation as a light probe, and those same light sources detected in the probes can be used when rendering the added 3D objects (e.g., by the furnishing module 112 and the layout module 114) to give them an appearance that better matches how they would look if they were actually present in the space. Also, if any detected light sources from the original space are identified as ones that should be removed along with the furnishings, that information about the changed light sources could be used when rendering the added 3D objects and could also be used to update the appearance of the defurnished version of the space, so that the removal of furnishings looks more realistic including any effects on light and shadows in the space.

Another way to improve the appearance of the added furnishings or the space in general is with AI-generated imagery. Information (e.g., input from the user and/or metadata) about the original space and the added furnishings could be input to a network, and the output may be an image of the newly furnished variant of the space. For example, a latent diffusion network like Stable Diffusion could be trained with high quality synthetic images of furnished spaces as its "ground truth" images, where its training inputs are renderings of the same scenes but with reduced rendering quality (e.g. missing lighting and/or shadows) for some of the objects in the scene. In that way the network is trained to take a low-quality rendering as input and produce a higher-quality, more realistic image (e.g. with correct lighting and/or shadows) as output. Another option would be to inpaint regions of images where the furnishings are to be added using a latent diffusion inpainting network and to provide guidance image(s) to the inpainting network (using ControlNet or similar) that contain information about the added furnishing(s), such as the lines or edges of the objects as rendered into the image. In this way the diffusion network can generate a realistic image (as it is trained to do in general) but guided or constrained to match the shapes and other attributes of the added furnishings. If the goal for the appearance of the added furnishings is something other than photorealism, the system could also be configured or trained to produce those other appearances, including appearances chosen or tuned based on individual user preferences or feedback.

The user interface for presentation of the variant of the space may also include features for collaboration and/or sharing between multiple users. For example, one user viewing the space could add notes or comments (associated with the space in general, with specific furnishing variants or details, and/or with 3D locations in the space) and other users viewing the same space or other variants of it could see and respond to those notes (e.g., via the communication module 104 that may allow interaction among any number of users viewing the same or similar digital model on multiple UI's thereby allowing communication through a centralized communication system). The system may also include features for saving and/or sharing the variants of space (complete or partial) with other users, on social media, etc. The interface may also support live collaboration between users related to the space, such as text, voice, and/or video chat. Other ways of supporting collaboration include drawing or sketching tools, or showing how other users are interacting with the space such as by showing other user's live mouse cursors or other interactions. Another feature to enable collaboration is to support simultaneous multi-user editing with versioning, history, and/or change notifications. One form of collaboration could be for a designer to create a variant or variants of a space and then share those variants with someone intending to furnish the space, such as an owner, renter, or facility manager, or for such users to work together to create a variant or variants of a space.

In some embodiments, the UI may optionally enable or assist the user in acquiring and placing the generated furnishings and/or materials to create a variant of a space physically. For example, if a user uses the system to generate a variant of their home that they like, the system could show an option to purchase some or all the furnishings and/or materials that were added to the space and have them delivered to the user. See for example FIGS. 5A-5D depicting a user interface with an "autodesigner" option to assist the user in acquiring and placing internal elements.

In some embodiments of refurnishing a digital model (e.g., a space), this could be done by associating a vendor with each item in the furnishing catalogs, and then during the presentation of the space (or as a separate communication), the space modification system 102 (e.g., via the communication module 104 and the UI) could offer an action to purchase the furnishings. If the user chooses that action (by clicking a button, etc.) then the communication module 104 may collect the item and vendor information for each of the added furnishings, materials, etc., generate web or app links for each item and/or vendor that can be used to purchase the item(s) from the vendor(s), and then present those links to the user. The user can then click on those links (presented in a UI, email, text message, secure message, and/or the like) and complete the purchase and delivery of the item(s). Beyond just creating and providing links to purchase the items, the communication module 104 may also manage more of the shopping experience and implement a deeper integration with the vendors. For example, there could be a virtual shopping cart and checkout flow built into the user interface (or a separate interface) that would let the user purchase the items without having to interact with other vendors. The set of items involved in any of these cases could be a single item, multiple items, all of the items in a room, all of the items in the entire space, or sets of these items from multiple variants of the space.

There are other possible approaches besides maintaining vendor or other purchasing information for each item in catalog(s) of furnishings. One such approach is for the identification module 106 to attempt to match the generated furnishings to real, purchasable items or appropriate substitutes, even if there is no pre-existing association for each generated furnishing. For example, the identification module 106 could use information about the generated furnishings with a search service to find purchasable items with similar characteristics such as appearance (possibly using an image-based search), item type, color, size, and function. The identification module 106 could also use a neural network trained to match information about an item (such as one or more images of it) with items available for purchase. This approach could allow a user to acquire the furnishings or suitable approximations even if the generated furnishings are not representations of real objects (e.g. the furnishings came from AI-generated imagery). When finding an approximate match to an item as above, or even when an exact item is known and available among the generated furnishings, the communication module 104 and/or the identification module 106 can offer alternative options for one or more items from among the generated furnishings and/or materials. The communication module 104 and/or the identification module 106 could offer the same or similar items from different vendor(s), targeting different budgets, or to match other goals or constraints. The communication module 104 and/or the identification module 106 could also export data about the generated furnishings to allow the user to perform their own search or even to create the furnishings themselves such as via 3D printing.

Beyond assisting the user in purchasing or acquiring the generated furnishings, the communication module 104 could offer additional features to help the user create the variant of the space physically. These additional features could include guides on how to place the physical furnishings such as a floor plan, placement guide, or instructions. The communication module 104 could even integrate with service(s) or vendor(s) who would place or install the furnishings and/or materials to match the generated design.

In order to better support this step, other steps can include accommodations for eventually purchasing or acquiring the furnishings and/or materials. For example, when generating and presenting the furnishings, the communication module 104 could choose to only use furnishings that are known to be available for purchase (or could offer an option to do apply such a restriction). This could be accomplished by integrating with vendors of the furnishings and keeping track of which items are still current and available for purchase, including adding new items as they become available. Going even further, the communication module 104 could integrate with those vendors to check which items are currently available in inventory and only use such items in the generated furnishings and/or materials. Even if the communication module 104 does not restrict the generated furnishings to ones available for purchase, later it could offer option(s) to modify a variant of the space to replace any physically unavailable items with available/purchasable items, or to generally update the variant in a way that the user would be able to recreate physically. In addition to creating or modifying the generated furnishings and/or materials to only use available items, the communication module 104 could create or modify the generated furnishings to prefer or exclude certain vendor(s), to use items with a particular budget goal or restriction, or to use items that can be delivered within a certain timeframe.

In addition to or instead of helping users acquire the generated furnishings, the communication module 104 could enable users to identify and acquire furnishings present in the original space. This could be accomplished via the approximate matching described above or by pre-matching items in spaces with purchasable items (with an automated, manual, or semi-manual approach). This feature could also be used independently of the rest of the communication module 104. For example, if a user is viewing a Matterport space in the interactive web viewer, that web viewer could identify purchasable items in the space and allow or invite the user to purchase them using any of the forms of shopping integration described above.

Figure 3A:
FIGS. 3A-3C depict an example user interface that may be utilized to defurnish a space in some embodiments.
Figure 3B:
Figure 3C:
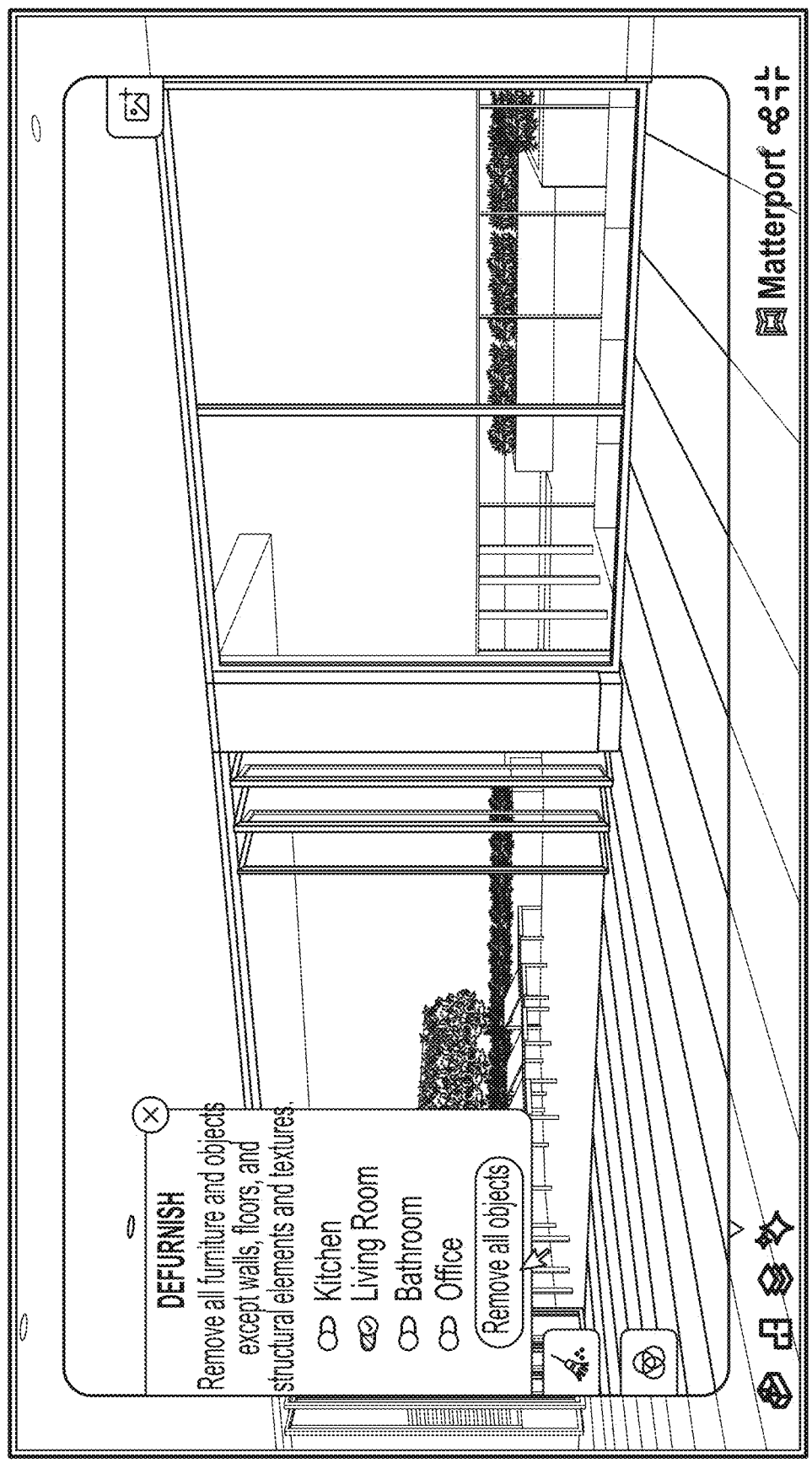

FIGS. 3A-3C depict an example user interface (UI) 300 that may be utilized to defurnish a space (i.e., digital model) in some embodiments. The example user interface 300 allows a user to select a de-furnishing icon and specify the type of room in the digital model (for example, kitchen, living room, bathroom, and office). In some embodiments, the UI may display the type of room based on metadata associated with the space to indicate the most likely room type (e.g., based on CNN and/or metadata that is a part of the 2D data, 3D data, and/or digital model. The user may then select a button to remove all objects from the space.

As discussed herein, the identification module 106 may identify internal elements of the room using a rules based approach and/or AI models. In some embodiments, the identification module 106 may utilize metadata to identify internal elements within the room from the 2D data, 3D data, and/or digital model.

FIG. 3B depicts a UI displaying options to defurnish different rooms of the digital model. It will be appreciated that the UI may enable a user to select internal elements to remove, to defurnish parts of a room, and/or the like.

FIG. 3C depicts the defurnished living room in some embodiments. In this example, the removal module 108 removed all internal elements (e.g., furniture) from the living room of the digital model. In some embodiments, the removal module 108 masks and infills the internal elements to make the digital model appear to be empty of those internal elements.

Figure 4A:
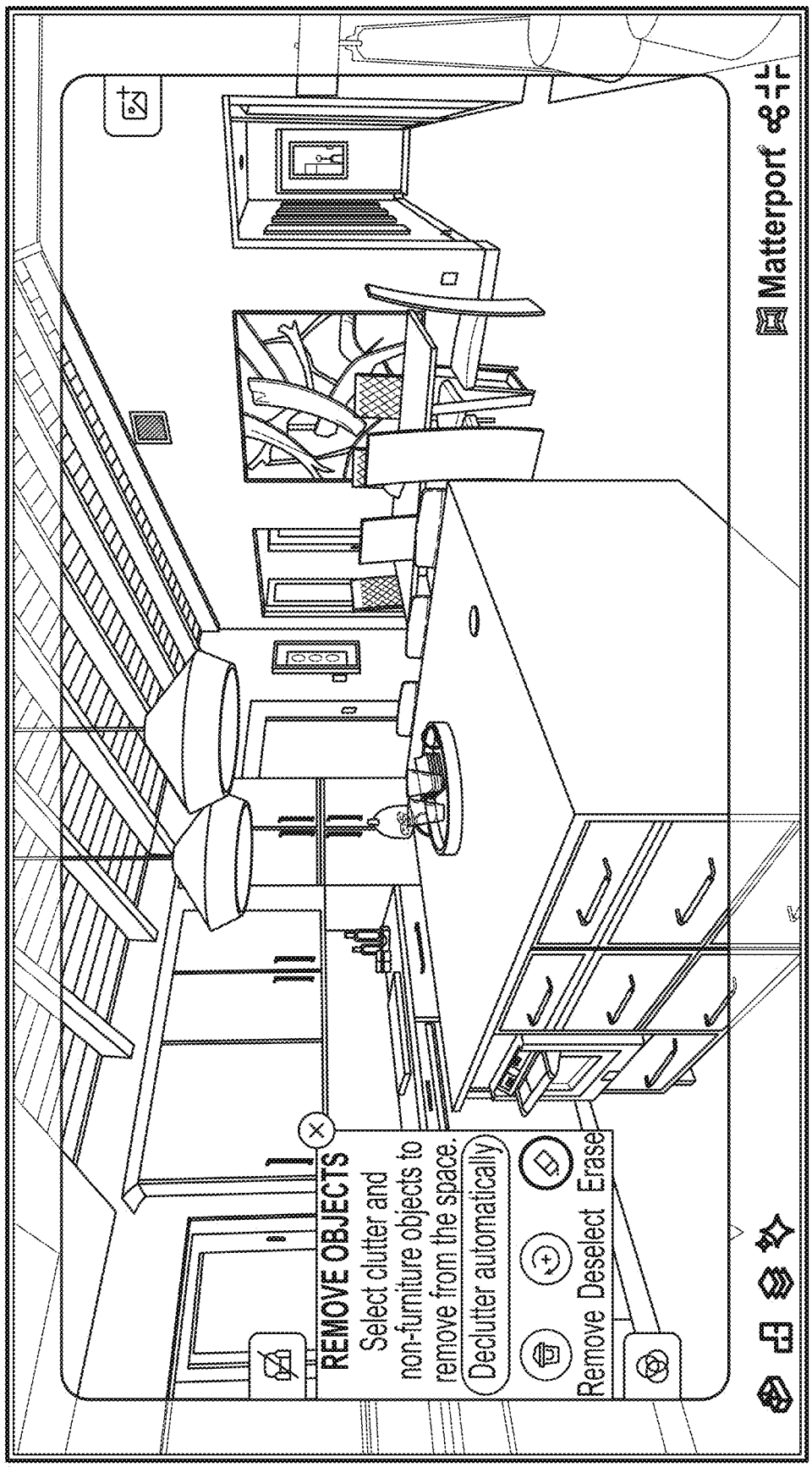
FIGS. 4A-4C depict an example user interface that may be utilized to remove objects from a space in some embodiments.
Figure 4B:
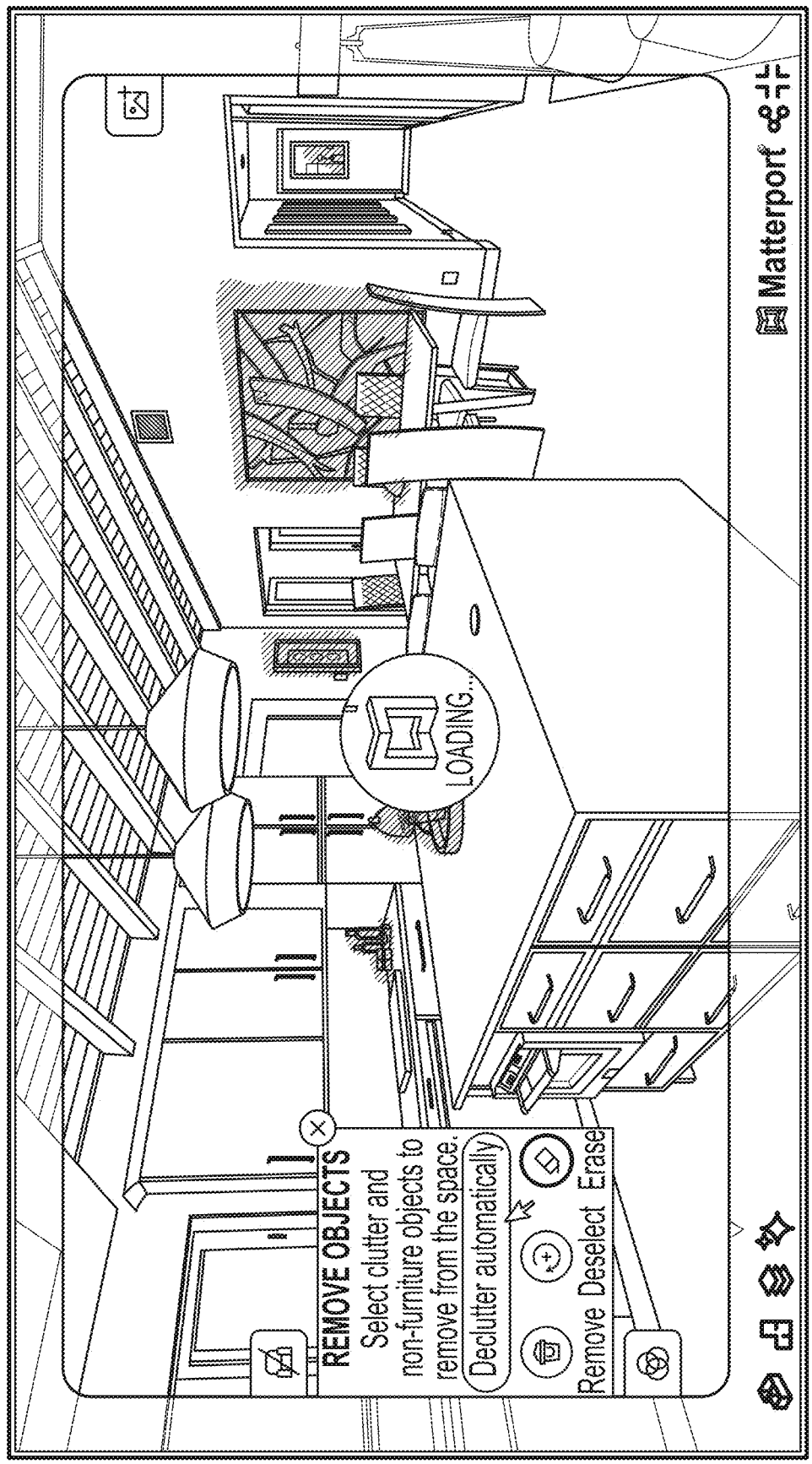
Figure 4C:
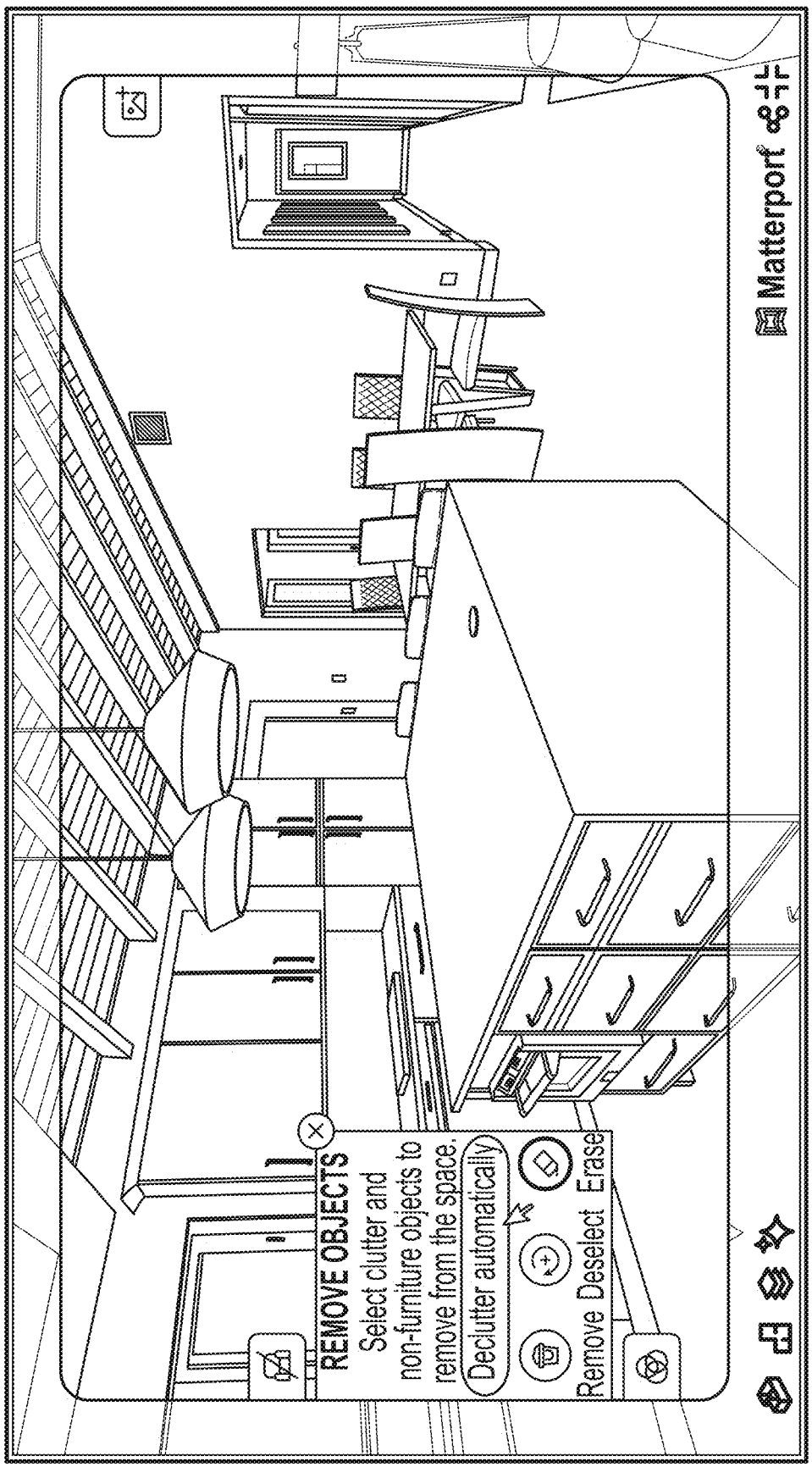

FIGS. 4A-4C depict an example user interface 400 that may be utilized to remove objects from a space in some embodiments. The example user interface 100 allows a user to select a decluttering icon. The user may then select objects individually or select a button to declutter the space automatically. In this example, the identification module 106 may identify small (e.g., within a threshold size), portable internal elements within the room(s) selected by the user.

FIG. 4B depicts an example user interface 400 in the process of "erasing" the small, portable internal elements (e.g., objects) from the room of choice in some embodiments. As discussed herein, the removal module 108 may remove all internal elements that quality under rules and/or selections by the user (e.g., small, portable objects identified by the identification module 106). The removal module 108 may mask and fill the mask to make the object(s) appear to be removed from the display of the room of choice.

FIG. 4C depicts an example user interface 400 with the small, portable internal elements appearing to be removed form the rom of choice in some embodiments.

FIGS. 5A-5D depict an example user interface 500 that may be utilized to furnish a space in some embodiments. The example user interface 500 allows a user to select a furnishing icon and select one or more styles and/or functions. In this example, the example user interface 500 also allows the user to input a text prompt that may be provided to an LLM. The response of the LLM may be utilized to determine a style to be utilized to furnish the space.

Use cases of the technology include the following:

Interior Design & Space Utilization: Helping homeowners, designers, and property managers reimagine a physical space with automated virtual interior design and staging, including making recommendations for how to optimize the use of these spaces.

Design & Construction: Making it simpler for homeowners, architects and builders to create more efficient, sustainable and accessible buildings.

Energy Efficiency: Providing insights on how to reduce energy consumption in buildings, potentially leading to lower energy bills and a smaller carbon footprint.

Maintenance & Repairs: Proactively surfacing the most common maintenance and repair issues for buildings, along with tips on how to prevent them, helping building owners and managers address issues before they become costly problems.

Safety & Security: Spotlighting potential safety and security risks for buildings, such as fire hazards or building code violations, along with recommendations for how to address these risks.

Other use cases of the technology will be apparent.

FIG. 5B depicts the room with a different design in some embodiments. In this example, the LLM may provide a design style. Based on rules associated with the design style (e.g., which may include color palate preferences, style types, and/or the like), the removal module 108 may remove internal elements that do not fit the selected design style). The furnishing module 112, layout module 114, and the modification module 110 may change internal elements, position internal elements, orient internal elements, modify textures, and colors to fit the design style.

Figure 5C:
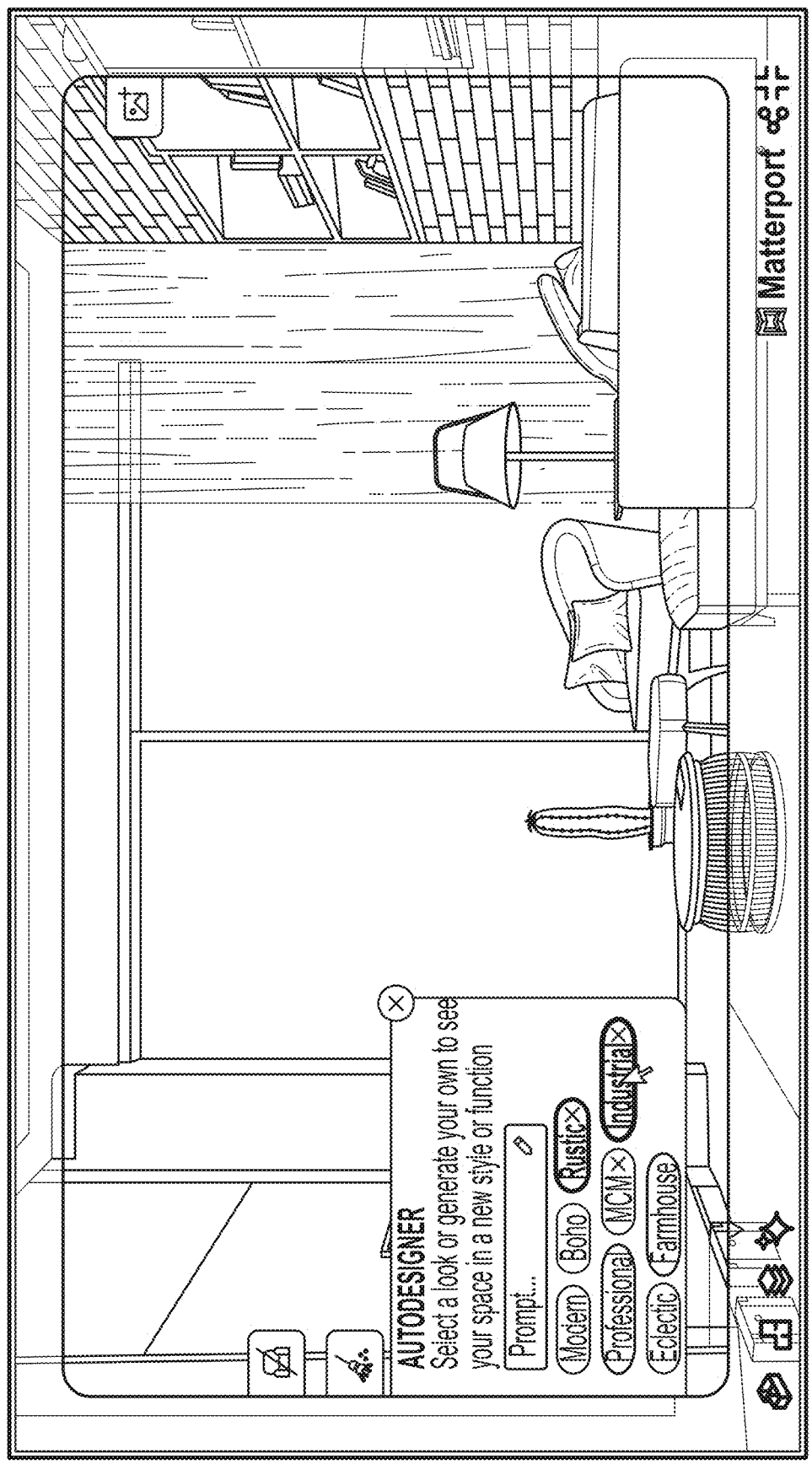
Figure 5D:
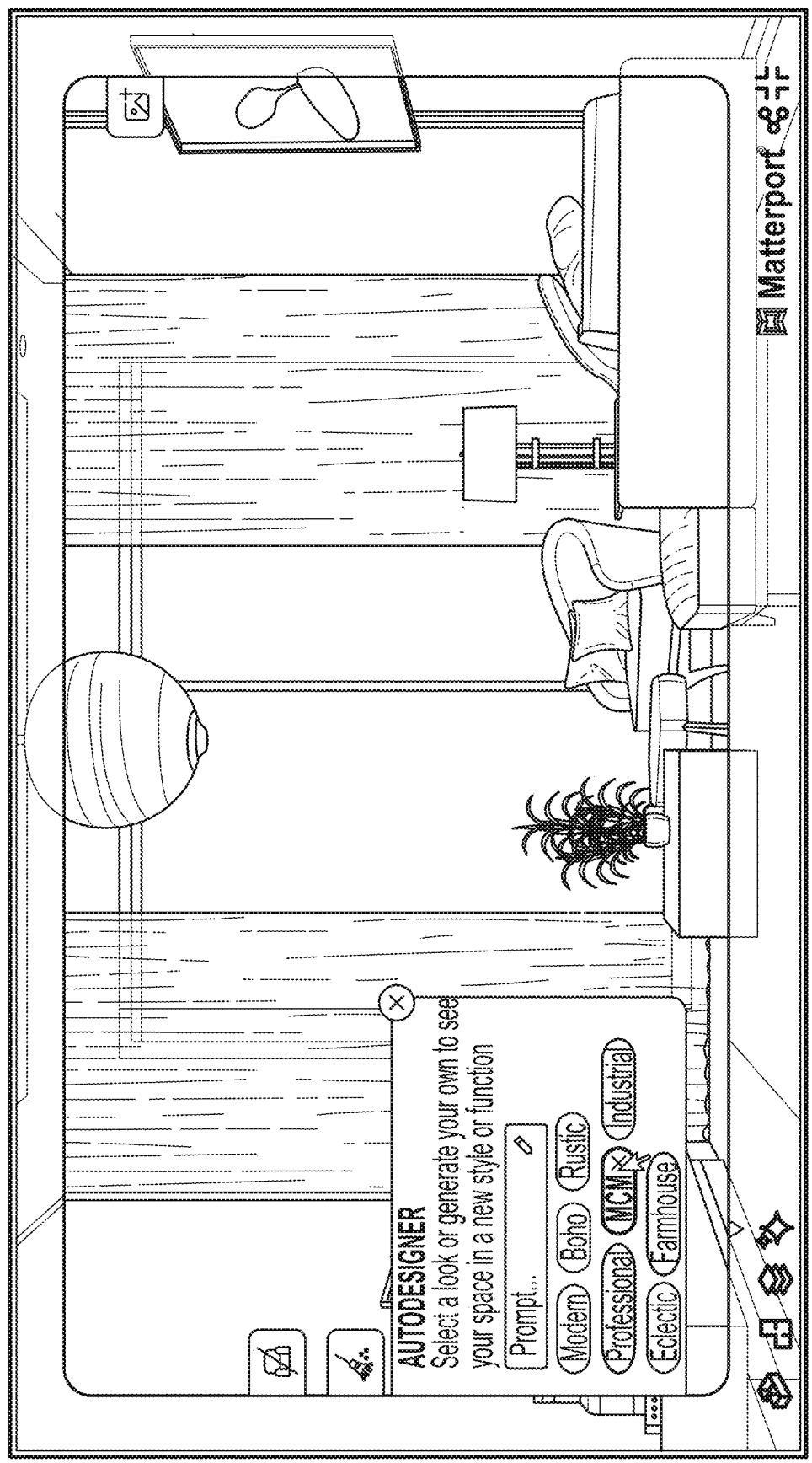

FIG. 5C depicts the room with another different design in some embodiments. The user may be given different options to experiment with different design styles and aesthetics.

Figure 6:
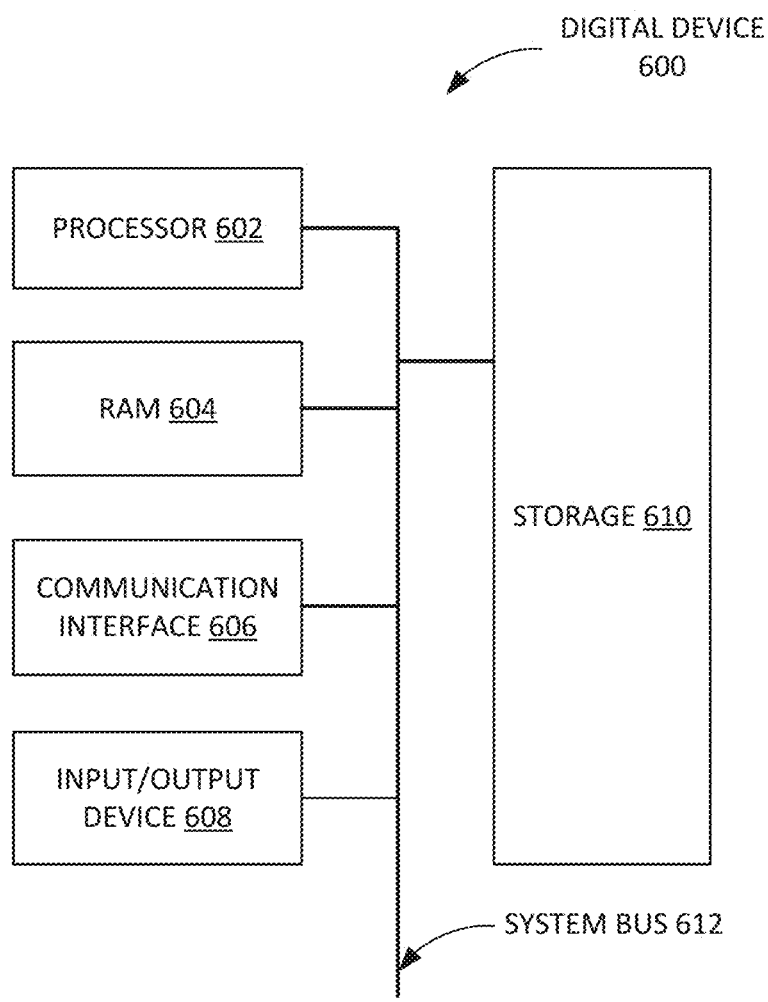
FIG. 6 depicts a block diagram of an example digital device that may be utilized by the technology described herein, according to some embodiments.

FIG. 6 depicts a block diagram of an example digital device 600 that may be utilized by the technology described herein, according to some embodiments. The digital device 600 is shown in the form of a general-purpose computing device. The digital device 600 includes at least one processor 602, RAM 604, communication interface 606, input/output device 608, storage 610, and a system bus 612 that couples various system components including storage 610 to the at least one processor 602. A system, such as a computing system, may be or include one or more of the digital device 600.

System bus 612 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The digital device 600 typically includes a variety of computer system readable media, such as computer system readable storage media. Such media may be any available media that is accessible by any of the systems described herein and it includes both volatile and nonvolatile media, removable and non-removable media.

In some embodiments, the at least one processor 602 is configured to execute executable instructions (for example, programs). In some embodiments, the at least one processor 602 comprises circuitry or any processor capable of processing the executable instructions.

In some embodiments, RAM 604 stores programs and/or data. In various embodiments, working data is stored within RAM 604. The data within RAM 604 may be cleared or ultimately transferred to storage 610, such as prior to reset and/or powering down the digital device 600.

In some embodiments, the digital device 600 is coupled to a network via communication interface 606.

In some embodiments, input/output device 608 is any device that inputs data (for example, mouse, keyboard, stylus, sensors, etc.) or outputs data (for example, speaker, display, virtual reality headset).

In some embodiments, storage 610 can include computer system readable media in the form of non-volatile memory, such as read only memory (ROM), programmable read only memory (PROM), solid-state drives (SSD), flash memory, and/or cache memory. Storage 610 may further include other removable/non-removable, volatile/non-volatile computer system storage media. By way of example only, storage 610 can be provided for reading from and writing to a non-removable, non-volatile magnetic media. The storage 610 may include a non-transitory computer-readable medium, or multiple non-transitory computer-readable media, which stores programs or applications for performing functions such as those described herein. Although not shown, a magnetic disk drive for reading from and writing to a removable, non-volatile magnetic disk (for example, a "floppy disk"), and an optical disk drive for reading from or writing to a removable, non-volatile optical disk such as a CDROM, DVD-ROM or other optical media can be provided. In such instances, each can be connected to system bus 612 by one or more data media interfaces. As will be further depicted and described below, storage 610 may include at least one program product having a set (for example, at least one) of program modules that are configured to carry out the functions of embodiments of the invention. In some embodiments, RAM 604 is found within storage 610.

Programs/utilities, having a set (at least one) of program modules may be stored in storage 610 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

It should be understood that although not shown, other hardware and/or software components could be used in conjunction with the digital device 600. Examples include, but are not limited to microcode, device drivers, redundant processing units, and external disk drive arrays, RAID systems, tape drives, and data archival storage systems, etc.

Exemplary embodiments are described herein in detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure.

It will be appreciated that aspects of one or more embodiments may be embodied as a system, method, or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a solid state drive (SSD), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program or data for use by or in connection with an instruction execution system, apparatus, or device.

A transitory computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++, Python, or the like and conventional procedural programming languages, such as the "C" programming language or similar programming languages. The computer program code may execute entirely on any of the systems described herein or on any combination of the systems described herein.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While specific examples are described above for illustrative purposes, various equivalent modifications are possible. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented concurrently or in parallel or may be performed at different times. Further any specific numbers noted herein are only examples: alternative implementations may employ differing values or ranges.

Throughout this specification, plural instances may implement components, operations, structures, and internal elements may be described as a single instance. Structures, internal elements, and functionality presented as separate components in example configurations may be implemented as a combined structure or component. Similarly, structures, internal elements, and functionality presented as a single component may be implemented as separate components. These and other variations, modifications, additions, and improvements fall within the scope of the subject matter herein. Furthermore, any specific numbers noted herein are only examples: alternative implementations may employ differing values or ranges.

Components may be described or illustrated as contained within or connected with other components. Such descriptions or illustrations are examples only, and other configurations may achieve the same or similar functionality. Components may be described or illustrated as "coupled," "couplable," "operably coupled," "communicably coupled" and the like to other components. Such description or illustration should be understood as indicating that such components may cooperate or interact with each other, and may be in direct or indirect physical, electrical, or communicative contact with each other.

Components may be described or illustrated as "configured to," "adapted to," "operative to," "configurable to," "adaptable to," "operable to" and the like. Such description or illustration should be understood to encompass components both in an active state and in an inactive or standby state unless required otherwise by context.

The use of "or" in this disclosure is not intended to be understood as an exclusive "or." Rather, "or" is to be understood as including "and/or." For example, the phrase "providing products or services" is intended to be understood as having several meanings: "providing products," "providing services," and "providing products and services."

It may be apparent that various modifications may be made, and other embodiments may be used without departing from the broader scope of the discussion herein. Therefore, these and other variations upon the example embodiments are intended to be covered by the disclosure herein.

The invention claimed is:

1. A non-transitory computer-readable medium comprising executable instructions, the executable instructions being executable by one or more processors to perform a method, the method comprising:
   accessing data of a multidimensional space representing a physical environment, the data including input 2D images of the physical environment;
   identifying interior elements within the input 2D images using a machine learning model, at least one of the interior elements representing furniture in the physical environment;
   masking one or more of the interior elements within the input 2D images with masks;
   filling each of the masks with imagery of the physical environment to generate filled 2D images, wherein filling includes utilizing a latent diffusion model to fill each of the masks with imagery of the physical environment to generate the filled 2D images, wherein the latent diffusion model was trained using first 2D images of unfurnished spaces, and wherein the latent diffusion model was fine-tuned using second 2D images of unfurnished spaces modified to include artifacts not present in the second 2D images of unfurnished spaces;
   generating, based on the input 2D images and the filled 2D images, output 2D images that create an appearance of a defurnished space, the defurnished space having the one or more interior elements appearing as missing from the multidimensional space representing the physical environment;
   providing, using the output 2D images, all or some of the defurnished space for display;
   generating one or more additional interior elements within the defurnished space based at least on characteristics of the one or more additional interior elements;
   positioning the one or more additional interior elements within the defurnished space based on a geometry of the defurnished space and a layout rule, the layout rule being applied to a position or orientation of the one or more additional interior elements within the defurnished space; and
   providing all or some of the defurnished space with the one or more additional interior elements positioned within the defurnished space for display.

2. The non-transitory computer-readable medium of claim 1, wherein the physical environment is a furnished room.

3. The non-transitory computer-readable medium of claim 1, wherein the multidimensional space is a 2D representation of the physical environment.

4. The non-transitory computer-readable medium of claim 3, wherein the 2D representation of the physical environment is used to generate a corresponding 3D representation of the physical environment.

5. The non-transitory computer-readable medium of claim 1, wherein the multidimensional space is a 3D representation of the physical environment.

6. The non-transitory computer-readable medium of claim 1, wherein the data of the multidimensional space further includes a textured 3D mesh.

7. The non-transitory computer-readable medium of claim 1, wherein the interior elements within the multidimensional space further include at least one wall within the physical environment.

8. The non-transitory computer-readable medium of claim 1, wherein the machine learning model includes a semantic segmentation neural network.

9. The non-transitory computer-readable medium of claim 1, wherein filling each of the masks with the imagery of the physical environment comprising applying inpainting to the masks.

10. The non-transitory computer-readable medium of claim 1, the method further comprising:
receiving a selection of at least one design style type from a user; and
selecting interior elements within the multidimensional space that were previously identified based on the at least one design style type from the user, wherein masking the one or more interior elements comprises masking the one or more interior elements that are of the at least one design style type.

11. The non-transitory computer-readable medium of claim 1, the method further comprising:
receiving a selection of at least one design style type from a user; and
selecting interior elements within the multidimensional space that were previously identified based on the at least one design style type from the user, wherein masking the one or more interior elements comprises masking the one or more interior elements that are not of the at least one design style type.

12. The non-transitory computer-readable medium of claim 1, wherein the one or more additional interior elements to be added to the defurnished space are requested by a user.

13. The non-transitory computer-readable medium of claim 12, the method further comprising:
receiving an additions request from the user, comprising receiving a prompt from a user; and
applying the prompt to a large language model to receive a response from the large language model, the response identifying the one or more additional interior elements.

14. A system comprising at least one processor and memory containing executable instructions, the executable instructions being executable by the at least one processor to:
access data of a multidimensional space representing a physical environment, the data including input 2D images of the physical environment;
identify interior elements within the input 2D images using a machine learning model, at least one of the interior elements representing furniture in the physical environment;
mask at least some of the interior elements within the input 2D images with masks;
fill each of the masks with imagery of the physical environment to generate filled 2D images, wherein filling includes utilizing a latent diffusion model to fill each of the masks with imagery of the physical environment to generate the filled 2D images, wherein the latent diffusion model was trained using first 2D images of unfurnished spaces, and wherein the latent diffusion model was fine-tuned using second 2D images of unfurnished spaces modified to include artifacts not present in the second 2D images of unfurnished spaces;
generating, based on the input 2D images and the filled 2D images, output 2D images that create an appearance of a defurnished space, the defurnished space having at least some of the interior elements appearing as missing from the multidimensional space representing the physical environment;
provide, using the output 2D images, all or some of the defurnished space for display;
generate one or more additional interior elements within the defurnished space based at least on characteristics of the one or more additional interior elements;
position the one or more additional interior elements within the defurnished space based on a geometry of the defurnished space and a layout rule, the layout rule being applied to a position or orientation of the one or more additional interior elements within the defurnished space; and
provide all or some of the defurnished space with the one or more additional interior elements positioned within the defurnished space for display.

15. The system of claim 14, wherein the physical environment is a furnished room.

16. The system of claim 14, wherein the multidimensional space is a 2D representation of the physical environment.

17. The system of claim 16, wherein the 2D representation of the physical environment is used to generate a corresponding 3D representation of the physical environment.

18. The system of claim 14, wherein the multidimensional space is a 3D representation of the physical environment.

19. The system of claim 14, wherein the data of the multidimensional space further includes a textured 3D mesh.

20. The system of claim 14, wherein the interior elements within the multidimensional space further include at least one wall within the physical environment.

21. The system of claim 14, wherein the machine learning model includes a semantic segmentation neural network.

22. The system of claim 14, wherein filling each of the masks with the imagery of the physical environment comprising applying inpainting to the masks.

23. The system of claim 14, the executable instructions being further executable by the at least one processor to:
receive a selection of at least one design style type from a user; and
select interior elements within the multidimensional space that were previously identified based on the at least one design style type from the user, wherein masking at least some of the interior elements comprises masking at least some of the interior elements that are of the at least one design style type.

24. The system of claim 14, the executable instructions being further executable by the at least one processor to:
receive a selection of at least one design style type from a user; and
select interior elements within the multidimensional space that were previously identified based on the at least one design style type from the user, wherein masking at least some of the interior elements comprises masking at least some of the interior elements that are not of the at least one design style type.

25. The system of claim 14, wherein the one or more additional interior elements to be added to the defurnished space are requested by a user.

26. The system of claim 25, wherein the executable instructions being further configured by the at least one processor to:
receive an additions request from the user, comprising to receive a prompt from a user; and apply the prompt to a large language model to receive a response from the large language model, the response identifying the one or more additional interior elements.

* * * * *